US010119604B2

(12) United States Patent
Li et al.

(10) Patent No.: US 10,119,604 B2
(45) Date of Patent: Nov. 6, 2018

(54) DAMPER ARCHITECTURES

(71) Applicant: GM GLOBAL TECHNOLOGY OPERATIONS LLC, Detroit, MI (US)

(72) Inventors: Dongxu Li, Troy, MI (US); Shushan Bai, Ann Arbor, MI (US)

(*) Notice: Subject to any disclaimer, the term of this patent is extended or adjusted under 35 U.S.C. 154(b) by 171 days.

(21) Appl. No.: 15/352,014

(22) Filed: Nov. 15, 2016

(65) Prior Publication Data

US 2018/0135736 A1 May 17, 2018

(51) Int. Cl.
*F16H 45/02* (2006.01)
*B60K 17/00* (2006.01)

(52) U.S. Cl.
CPC .............. *F16H 45/02* (2013.01); *B60K 17/00* (2013.01); *F16H 2045/0221* (2013.01); *F16H 2045/0268* (2013.01)

(58) Field of Classification Search
CPC ....................................................... F16H 45/02
See application file for complete search history.

(56) References Cited

U.S. PATENT DOCUMENTS

| 5,334,112 A | 8/1994 | Nogle et al. |
| 8,628,441 B2 | 1/2014 | Robinette et al. |
| 9,500,259 B1 | 11/2016 | Bai |
| 2013/0244800 A1 | 9/2013 | Sakai et al. |

FOREIGN PATENT DOCUMENTS

| DE | 4422732 A1 | 6/1995 |
| DE | 19700851 A1 | 7/1997 |
| DE | 102007053848 A1 | 7/2008 |
| DE | 102011007118 A1 | 12/2011 |
| DE | 102014103274 A1 | 9/2014 |
| JP | 2008163977 A | 7/2008 |

OTHER PUBLICATIONS

US Application filed Nov. 8, 2016 U.S. Appl. No. 15/346,349, Applicant: GM Global Technology Operations LLC; Title: Control of a Continuously Variable Transmission Using Fast Fourier Transformation.
US Application filed Jun. 28, 2016 U.S. Appl. No. 15/194,598, Applicant: GM Global Technology Operations LLC; Title: Torsional Vibration Absorption System.
US Application filed Mar. 3, 2016 U.S. Appl. No. 15/060,129, Applicant: GM Global Technology Operations LLC; Title: Torsional Vibration Damper With Planetary Gear Enhanced by Inertial Mass.
US Application filed Jan. 7, 2016 U.S. Appl. No. 14/990,033, Applicant: GM Global Technology Operations LLC; Title: Long Travel Damper Using a Clockspring.
US Application filed Dec. 8, 2015 U.S. Appl. No. 14/962,665, Applicant: GM Global Technology Operations LLC; Title: Torsional Vibration Damper.

*Primary Examiner* — Derek D Knight

(57) ABSTRACT

A torque transfer assembly includes input and output members configured to transfer torque from a prime mover to an automotive transmission. A torque transfer component, such as a torque converter or a dual-mass fly wheel, and a clutch are coupled to the input member. A torsional vibration damper includes a planetary gear set having first, second, and third nodes. First and second spring engagement elements are connected to two of the first, second, and third nodes. One or more springs contacts both of the first and second spring engagement elements. An outgoing member of the torque multiplying device is coupled to the first node of the planetary gear set, a driven element of the clutch is connected to the second node of the planetary gear set, and the output member is coupled to the third node of the planetary gear set.

19 Claims, 17 Drawing Sheets

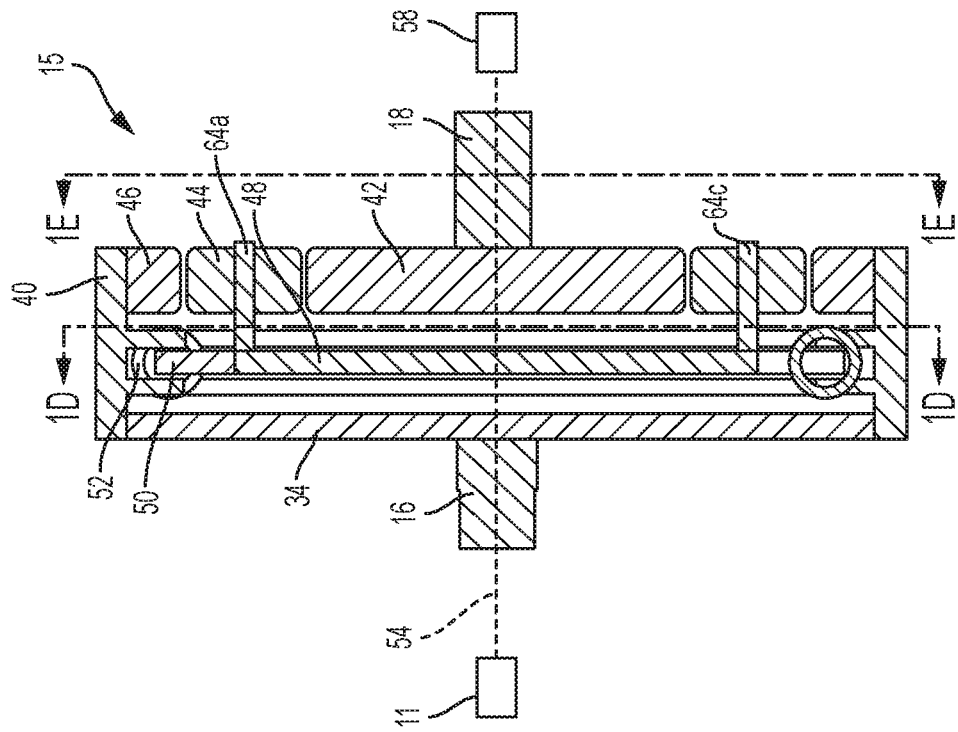
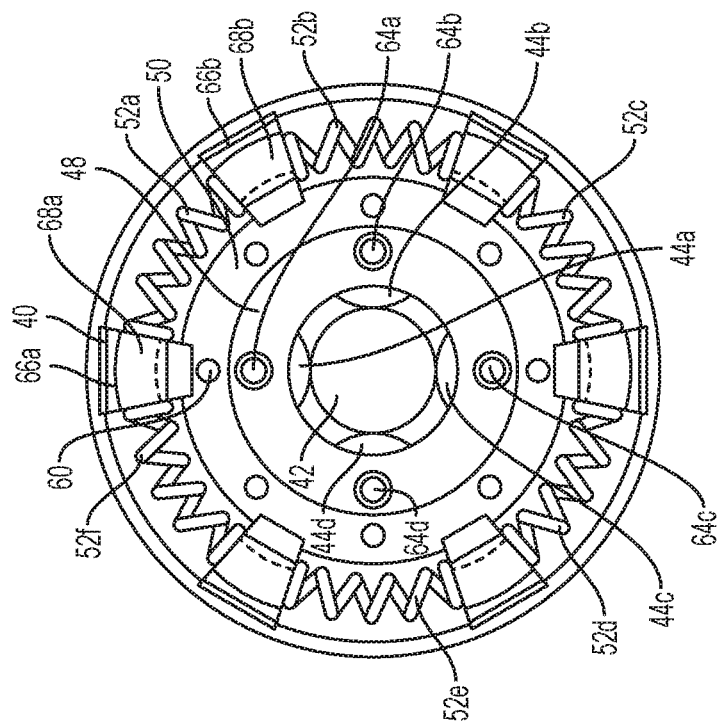

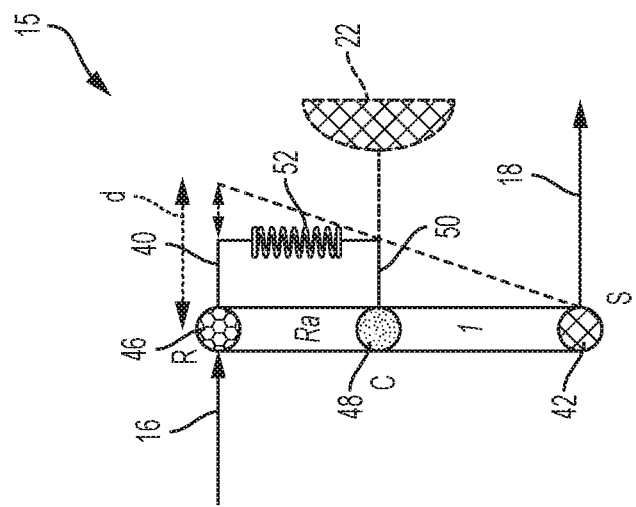
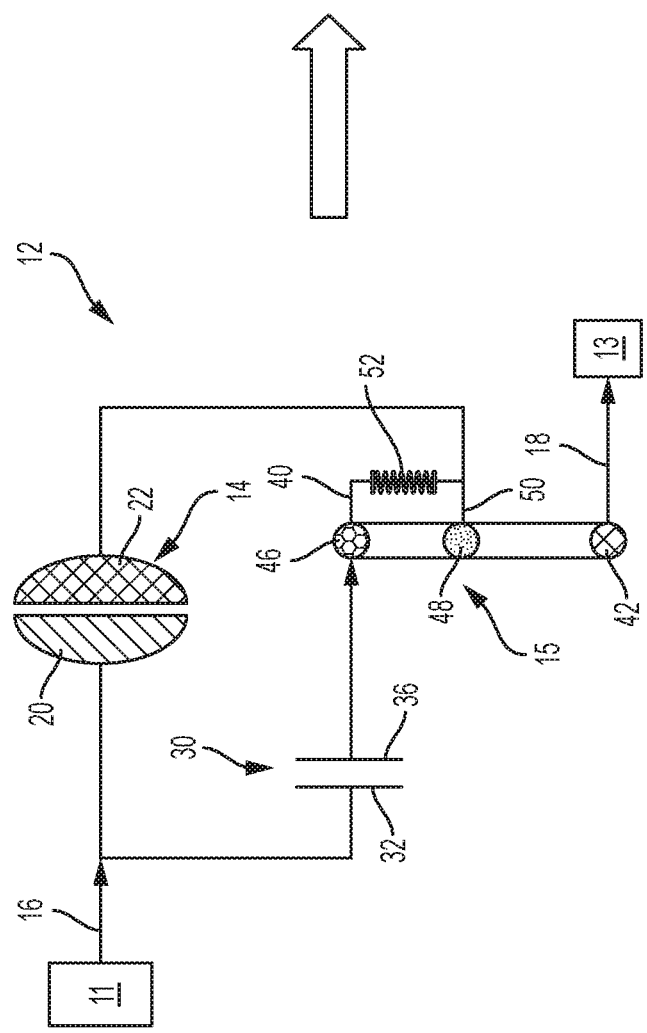
FIG. 3
FIG. 2A

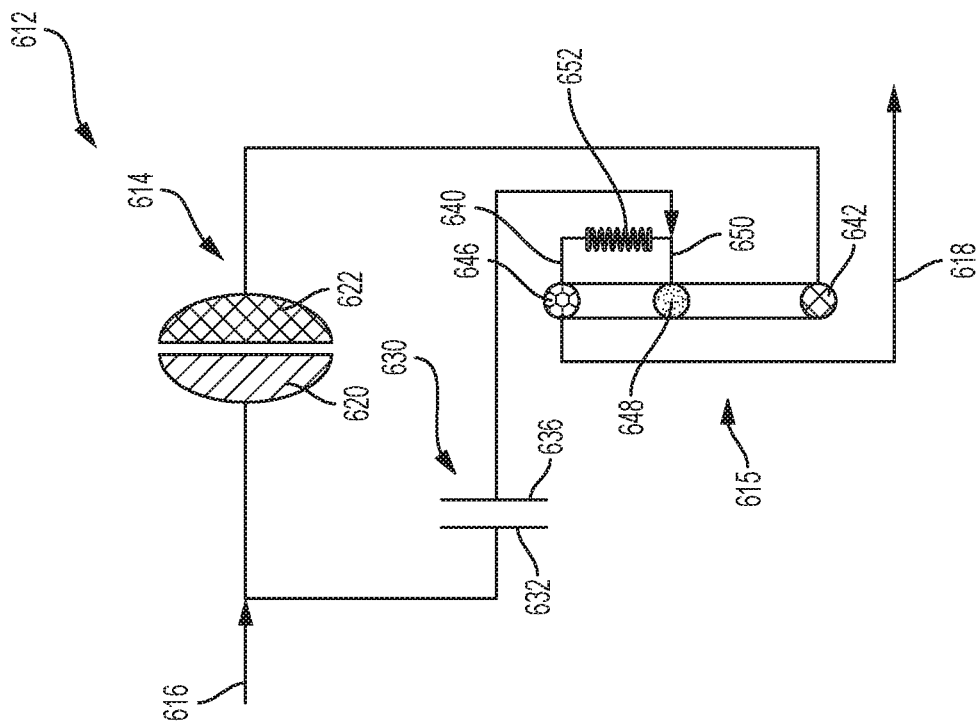
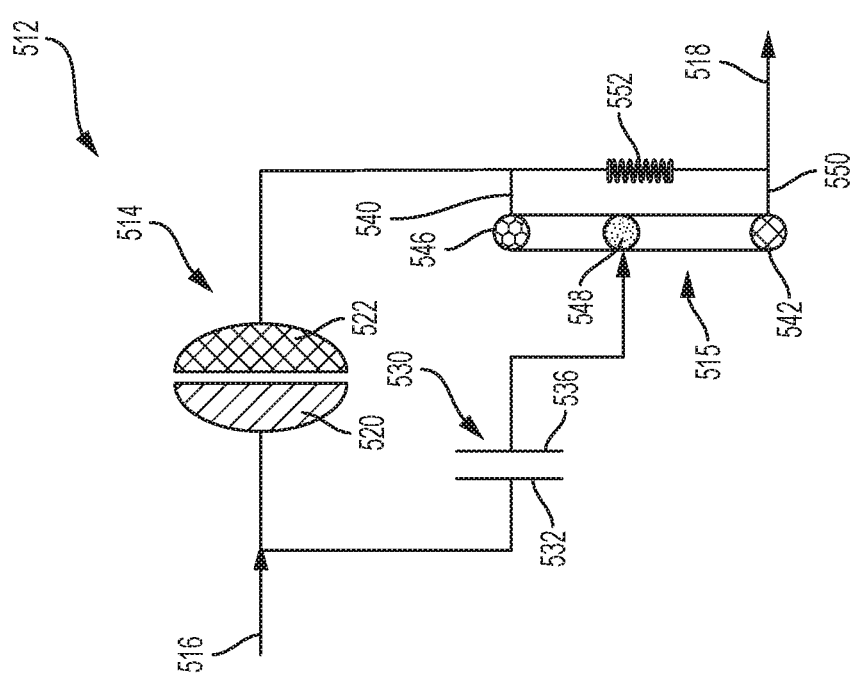

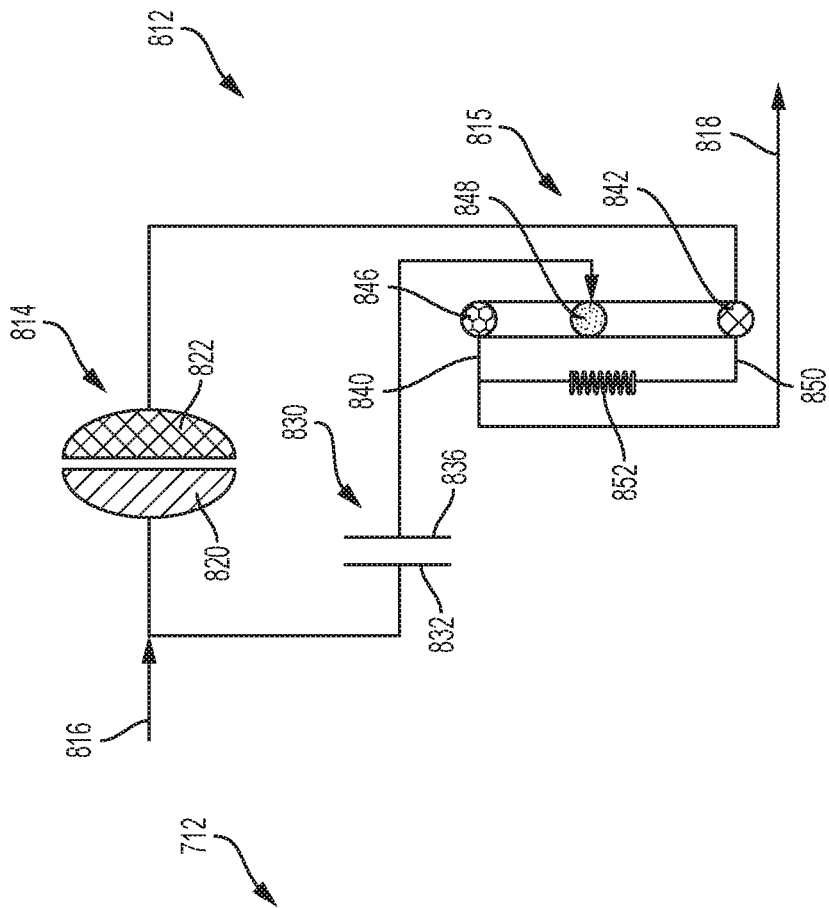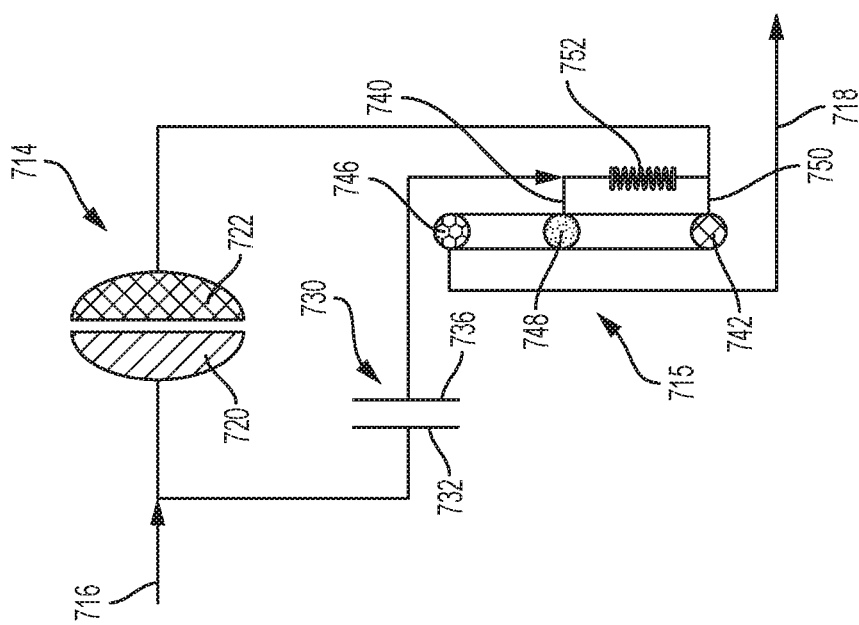

DAMPER ARCHITECTURES

FIELD

The present disclosure relates to propulsion systems for motor vehicles, and more particularly, to propulsion systems that include planetary gear sets incorporated into vibration dampers to reduce torsional vibration between engines and transmissions.

INTRODUCTION

Motor vehicle engines produce torsional vibration that is undesirable to transmit through the motor vehicle propulsion system. Typically, a torsional isolator or damper is used to isolate or reduce the torsional vibration transmitted from the engine to the transmission. The torsional damper can be placed within a torque converter between a torque converter lockup clutch and an input shaft of the transmission. Known torsional dampers use one or more springs to store energy and to dampen an energy transfer path between the engine and the transmission. However, in certain propulsion systems, the torsional damper is insufficient to isolate the torsional vibrations given the design space and the limitation on travel of the damper assembly.

SUMMARY

The present disclosure provides examples of a torque converter assembly including a planetary torsional vibration damper. The torsional vibration damper includes a planetary gear set having three nodes, one node being a sun gear, another node being a carrier, and yet another node being a ring gear. One of the three nodes is connected to the transmission input shaft, while a second of the three nodes is connected to the torque converter turbine, and a third of the three nodes is connected to the lockup clutch. Improved isolation performance is possible by connecting each of the torque converter turbine, the lockup clutch, and the transmission input shaft to different nodes of the planetary gear set. In one variation, a first node is connected to the engine output shaft, a second node is connected to the transmission input shaft, and a third node is connected to one end of the spring within the damper assembly.

In one example, which may be combined with or separate from the other examples herein, a torque transfer assembly configured to transfer torque between a prime mover and an automotive transmission is provided. The torque transfer assembly includes an input member configured to transfer torque from the prime mover and an output member configured to transfer torque to the automotive transmission. A torque transfer component has an incoming side and an outgoing side. The incoming side is coupled to the input member. A clutch has a driving element and a driven element, and the driving element being coupled to the input member. A torsional vibration damper is included, which has a planetary gear set having a first node, a second node, and a third node. A first spring engagement element is connected to one of the first, second, and third nodes, and a second spring engagement element connected to another of the first, second, and third nodes. At least one spring contacts both the second spring engagement element and the first spring engagement element and is configured to permit the second spring engagement element to angularly deflect with respect to the first spring engagement element. The outgoing side of the torque transfer component is coupled to the first node of the planetary gear set, the driven element of the lockup clutch is connected to the second node of the planetary gear set, and the output member is coupled to the third node of the planetary gear set.

In another example, which may be combined with or separate from the other examples herein, a torque converter assembly is configured to transfer torque between a prime mover and an automotive transmission. The torque converter assembly includes an input member configured to transfer torque from the prime mover and an output member configured to transfer torque to the automotive transmission. A torque converter, which has a pump and a turbine, is coupled to the input member. A lockup clutch, which has a driven element and a driving element, is also coupled to the input member. The torque converter assembly also has a torsional vibration damper, which includes a planetary gear set having a first node, a second node, and a third node. A first spring engagement element is connected to one of the first, second, and third nodes, and a second spring engagement element connected to another of the first, second, and third nodes. At least one spring contacts both the second spring engagement element and the first spring engagement element and is configured to permit the second spring engagement element to angularly deflect with respect to the first spring engagement element. The turbine is coupled to the first node of the planetary gear set, the driven element of the lockup clutch is connected to the second node of the planetary gear set, and the output member is coupled to the third node of the planetary gear set.

In yet another example, which may be combined with or separate from the other examples provided herein, a powertrain for a motor vehicle includes an engine configured to be disposed in the motor vehicle and having an engine output member. The powertrain also includes an automatic transmission selectively connected to the engine. The automatic transmission has a transmission input shaft. A torque converter assembly is configured to transfer torque between the engine and the automatic transmission. The torque converter assembly includes a torque converter having a pump and a turbine, the pump being coupled to the engine output member. The torque converter assembly also includes a lockup clutch and a torsional vibration damper. The lockup clutch has a driven element and a driving element. The driving element is coupled to the engine output member. The torsional vibration damper includes a planetary gear set having a first node, a second node, and a third node. A first spring engagement element is connected to one of the first, second, and third nodes, and a second spring engagement element connected to another of the first, second, and third nodes. At least one spring contacts both the second spring engagement element and the first spring engagement element and is configured to permit the second spring engagement element to angularly deflect with respect to the first spring engagement element. The turbine is coupled to the first node of the planetary gear set, the driven element of the lockup clutch is connected to the second node of the planetary gear set, and the transmission input member is coupled to the third node of the planetary gear set.

Additional features may be included, such as, but not limited to, the following: the torque transfer component is one of a torque converter and a dual-mass flywheel; each of the first, second, and third nodes comprising one of the following: a ring gear, a carrier member, and a sun gear; the first node being a carrier member, the second node being a ring gear, and the third node being a sun gear; the first spring engagement element being connected to the ring gear, and the second spring engagement element being connected to the carrier member; the first spring engagement element being connected to the carrier member, and the second spring engagement element being connected to the sun gear; the first spring engagement element being connected to the ring gear, and the second spring engagement element being connected to the sun gear; the first node being a carrier member, the second node being a sun gear, and the third node being a ring gear; the first node being a ring gear, the second node being a carrier member, and the third node being a sun gear; the first node being a ring gear, the second node being a sun gear, and the third node being a carrier member; the first node being a sun gear, the second node being a ring gear, and the third node being a carrier member; and the first node being a sun gear, the second node being a carrier member, and the third node being a ring gear.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1B is a partial cross-sectional view taken at section 1B-1B of FIG. 1A, including an end elevational view of a portion of the torsional vibration damper, in accordance with the principles of the present disclosure;

FIG. 1C is a diagrammatic cross-sectional view of the torsional vibration damper illustrated in FIGS. 1A-1B, according to the principles of the present disclosure;

FIG. 2A is a schematic diagrammatic view of the torque converter assembly of FIG. 1A, including the torsional vibration damper, in accordance with the principles of the present disclosure;

FIG. 3 is a schematic diagrammatic view of the torsional vibration damper shown in FIG. 2A, according to the principles of the present disclosure;

FIG. 4C is a schematic diagrammatic view of still another variation of a torque converter assembly, in accordance with the principles of the present disclosure;

FIG. 5A is a schematic diagrammatic view of still another variation of a torque converter assembly, in accordance with the principles of the present disclosure;

FIG. 5B is a schematic diagrammatic view of still another variation of a torque converter assembly, according to the principles of the present disclosure;

FIG. 5C is a schematic diagrammatic view of still another variation of a torque converter assembly, in accordance with the principles of the present disclosure;

DETAILED DESCRIPTION

The following description is merely exemplary in nature and is not intended to limit the present disclosure, its application, or its uses.

Figure 1A:
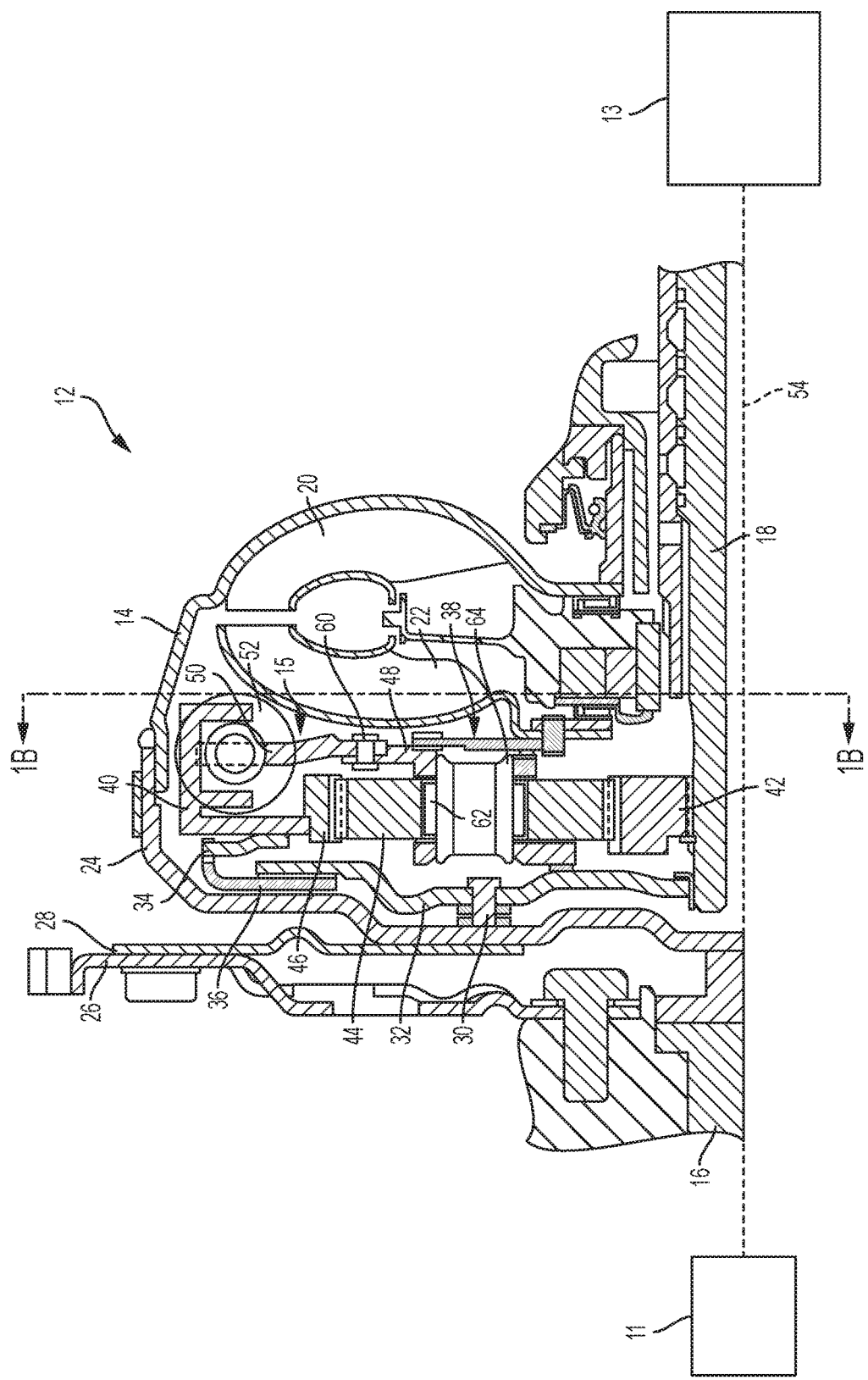
FIG. 1A is a cross-sectional view of a motor vehicle powertrain, including a torque converter assembly with a torsional vibration damper, according to the principles of the present disclosure.

With reference to FIG. 1A, a powertrain 10 for a motor vehicle includes an engine 11, a transmission 13, and a torque converter assembly 12 positioned between the engine 11 and the transmission 13. The torque converter assembly 12 includes a torsional vibration isolator or damper 15 to isolate engine torque pulsations between an engine drive component 16 and a transmission input shaft 18.

The torque converter assembly 12 has a torque converter 14, which generally includes a pump 20, a turbine 22, and a stator (not shown) positioned within a torque converter housing 24. The pump 20 is driven by the engine drive component 16, which may be a propeller shaft. The turbine 22 is fluidly driven by rotation of the pump 20. The stator is located between the pump 20 and the turbine 22 and is used to multiply torque within the torque converter 14. The torque converter housing 24 is flexibly connected to an engine interface 26, for example by fasteners through a flex plate 28. In other variations, another torque transfer component may be used instead of the torque converter assembly 12. For example, a dual-mass fly wheel could alternatively be used.

The torque converter assembly 12 also includes a lockup clutch 30 that is operable to selectively mechanically couple the pump 20 to the turbine 22. The lockup clutch may include a driving member 32 that may be selectively coupled to a driven member 36, such as a clutch plate. The input to the torsional vibrational isolator 15 may be provided through a connection plate 34 fixed to the driven member 36.

The torsional vibration damper 15 is coupled between the engine output shaft 16 and the transmission input shaft 18 to reduce torsional vibration in the path between the engine drive component 16 and the transmission shaft 18. The connection plate 34 may be fixed to a first spring engagement element 40, for example by welding. To increase the effective range of torsional vibration reduction, the torsional vibrational damper 15 includes a planetary gear set 38. The planetary gear set 38 has three nodes, which include a sun gear 42, a carrier member 48 bearing multiple pinion gears 44, and a ring gear 46.

Figure 1E:
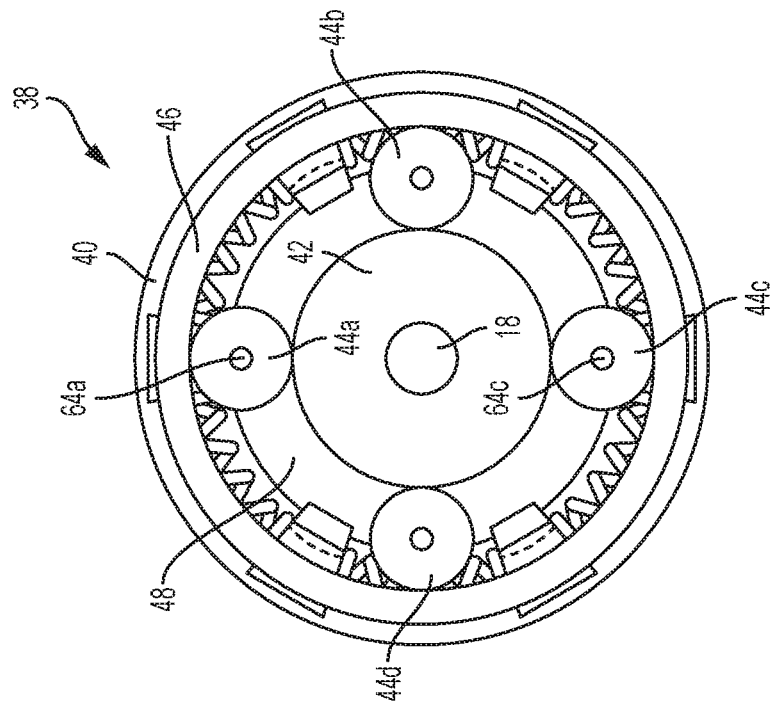
FIG. 1E is a partial cross-sectional end taken at section 1E-1E of FIG. 1C, according to the principles of the present disclosure.

Referring to FIGS. 1A and 1E, the sun gear 42 has internal gear teeth meshing with a spline gear of the transmission input shaft 18, in this example. The multiple pinion gears 44 individually rotate about the sun gear 42, and each of the pinion gears 44 have external gear teeth meshing with external gear teeth of the sun gear 42. The external gear teeth of each of the pinion gears 44 are also meshed to internal gear teeth of the ring gear 46, which is positioned having the pinion gears 44 internal to the ring gear 46. The pinion gears 44 are individually rotatably mounted to separate pinion shafts (described in greater detail below) that are fixed to the carrier 48 (described in greater detail below).

A second spring engagement element 50 is connected to the carrier 48, in this example, and the second spring engagement element 50 contacts one or more springs 52. The springs 52, which may be compression springs, are positioned between and are compressed by relative angular rotation between the second spring engagement element 50 and the first spring engagement element 40, as the first spring engagement element 40 angularly rotates with respect to the second spring engagement element 50. In some variations, the springs 52 may be connected to the first and second engagement elements 40, 50; and in other variations, the springs 52 simply contact and are bounded by the first and second engagement elements 40, 50 without being connected. The second spring engagement element 50 is connected to the carrier 48. Torsional vibration reduction is achieved in part by compression and subsequent expansion of the springs 52, which store the energy received by angular rotation between the first spring engagement element 40 and the second spring engagement element 50.

In the illustrated example, the first spring engagement element 40 is fixed to the ring gear 46, and the second spring engagement element 50 is connected to the carrier 48 using multiple fasteners such as rivets 60. The carrier 48 rotates with respect to the transmission input shaft 18, in this example. To rotatably connect the pinion gears 44 to the carrier 48, a needle bearing 62 is positioned between each of the pinion gears 44 and a pinion shaft 64, which is connected to the carrier 48. The turbine 22 is directly coupled to the carrier 48, and there is no direct connection between the turbine 22 and the transmission input shaft 18, in this example.

FIG. 1B illustrates the spring engagement elements 40, 50 and springs 52. In this example, the multiple springs 52 include six springs identified as springs 52a, 52b, 52c, 52d, 52e, 52f. Each of the springs 52 is separated from a successive spring 52 by a first engagement tongue 66 fixed to and extending radially inwardly from the first spring engagement element 40, and a second engagement tongue 68 fixed to and extending radially outwardly from the second spring engagement element 50. For example, spring 52a is retained between and contacts the first engagement tongue 66a and the second engagement tongue 68a at one end of the spring 52a, and also contacts the first engagement tongue 66b and the second engagement tongue 68b at an opposite second end of the spring 52a. Torsional rotation of the carrier 48, and thereby the second spring engagement element 50 connected to the carrier 48, compresses each of the springs 52a, 52b, 52c, 52d, 52e, 52f against the individual first engagement tongues 66 of the first spring engagement element 40.

Referring to FIG. 1C and again to FIGS. 1A-1B, the input member of the torsional vibration damper 15 is the engine drive component 16 selectively connected to the connection plate 34 and the first spring engagement element 40 through the torque converter clutch 30 (shown in FIG. 1A), and the transmission input shaft 18 defines the output of the torque converter assembly 12 and torsional vibration damper 15. The first spring engagement element 40 is connected to the spring(s) 52 and vibration isolated from the carrier 48. The connection plate 34 is connected to the first spring engagement element 40 and to the ring gear 46. The sun gear 42 is connected to the transmission input shaft 18, acting as the output member to the torque converter assembly 12. Each of the pinion gears 44, which includes four pinion gears 44a, 44b, 44c, 44d in this example, are rotatably connected to the carrier 48 by the individual pinion shafts 64a, 64b, 64c, 64d. Thus, the springs 52 isolate the input 16 from the carrier 48, and are further isolated from the output 18 through the gearing between the carrier 48 and the sun gear 42.

Figure 1D:
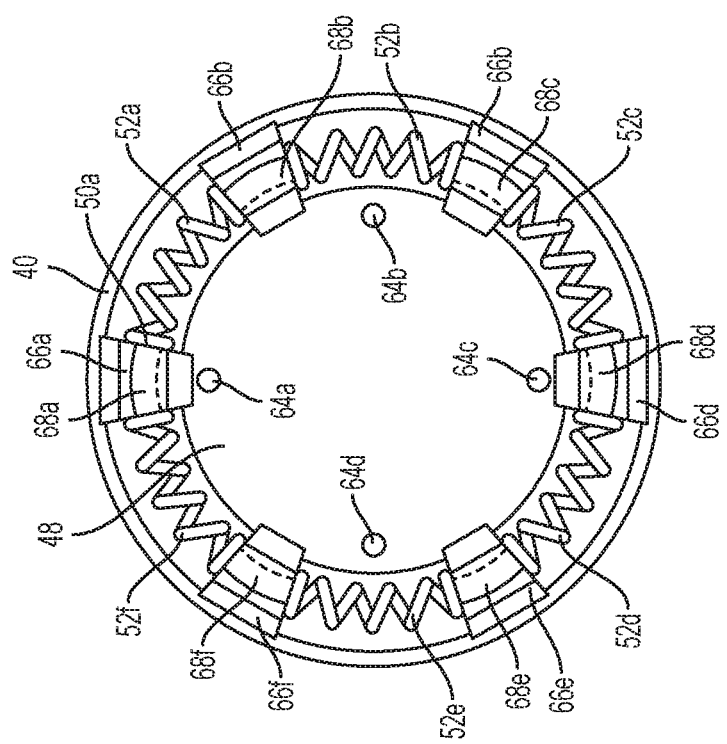
FIG. 1D is a partial cross-sectional view taken at section 1D-1D of FIG. 1C, in accordance with the principles of the present disclosure.

Referring to FIG. 1D and again to FIGS. 1A-1B, the carrier 48 supports the pinion gears 44 using the individual pinion shafts 64a, 64b, 64c, 64d arranged in quadrants about the carrier 48. Six pairs of the engagement tongues, including first and second engagement tongue pairs (66a, 68a); (66b, 68b); (66c, 68c); (66d, 68d); (66e, 68e); and (66f, 68f) separate the individual springs 52a, 52b, 52c, 52d, 52e, 52f allowing simultaneous and substantially equal deflection of each of the springs 52a, 52b, 52c, 52d, 52e, 52f.

To achieve more effective torsional vibration isolation, it is desirable to reduce the spring coefficient and provide a larger maximum angular displacement between the input 16 and output 18 of the torque converter assembly 12. Known torsional vibration isolators using only springs to dampen torsional vibration are limited by the spring coefficient and spring length, and therefore have a limited angular displacement of the isolator components. By the additional use of the planetary gear set 38 described herein, with each node connected one of the lockup clutch 30, the turbine 22, and the output 18 (transmission input), an increase in a maximum angular displacement of the torque converter assembly 12 is achieved.

It should also be appreciated that the torsional vibrational damper 15 may have other configurations, such as having fewer or greater than six springs, springs in parallel, and modifications with respect to the quantity of planet gears of the planetary gear set 38 without departing from the scope of the present disclosure.

Referring to FIG. 2A, the connections within the torque converter assembly 12 are clearly illustrated. For example, the engine output shaft 16 (which is an input to the torque converter assembly 12), is coupled to the pump side 20 of the torque converter 14 and to the driving member 32 of the lockup clutch 30. The driving member 32 of the lockup clutch 30 is selectively connectable to the driven member 36 of the lockup clutch 30, which when connected, results in coupling together the pump 20 and turbine 22 of the torque converter 14. The driven member 36 of the lockup clutch 30 is coupled to the ring gear 46 of the torsional vibration damper 15. The first spring engagement element 40 is also connected to the ring gear 46, and the second spring engagement element 50 is connected to the carrier 48. One or more springs 52 contacts both the first spring engagement element 40 and the second spring engagement element 50. The turbine side 22 of the torque converter 14 is coupled to the carrier 48. The sun gear 42 is coupled to the output of the torque converter assembly 12, which is coupled to or formed with the transmission input member 18 of the transmission 13.

Such a configuration may result in a long travel damper 15 between the input and output members 16, 18 of the torque converter assembly 12. For example, referring to FIG. 3, when a vibration occurs between the input and output members 16, 18, a long travel distance d may result between the input member 16 and the output member 18. The fact that the spring 52 is disposed between first and second planetary nodes, one of them being connected to the input 16, and the output 18 is connected to a third planetary node, increases the travel length d.

Figure 2B:
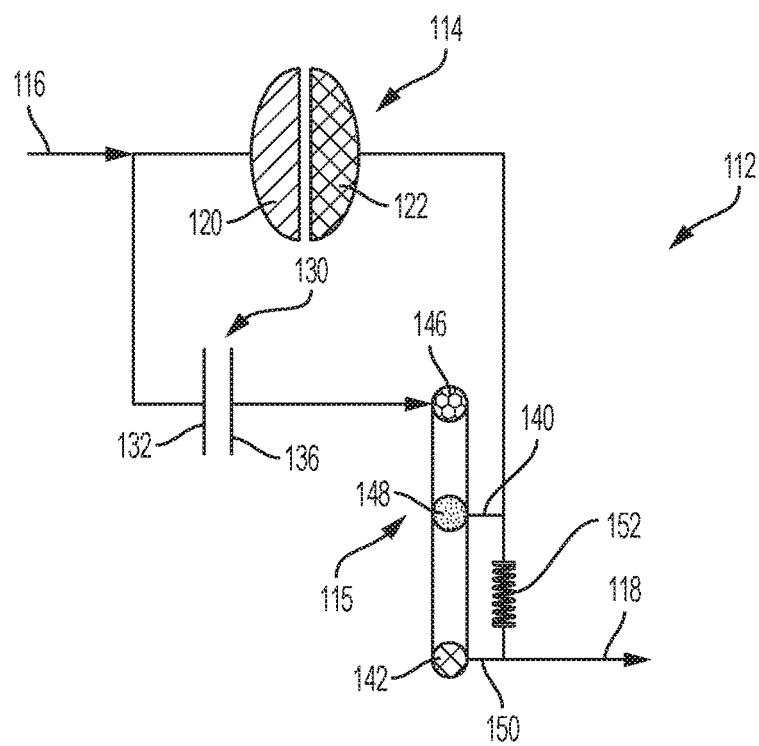
FIG. 2B is a schematic diagrammatic view of another variation of a torque converter assembly, according to the principles of the present disclosure.

Referring now to FIG. 2B, another variation of a torque converter assembly is schematically illustrated and generally designated at 112. It should be understood that the cross-sectional view of the torque converter assembly 112 may be substantially similar to the cross-sectional view of the torque converter assembly 12 shown above in FIG. 1A, and the details of the torsional vibration damper 15 described in FIGS. 1B-1E may be applied to the torsional vibration damper 115 shown in FIG. 2B, except where any specific differences are described. To this end, similar elements are labeled with a similar number incremented by 100.

The torque converter assembly 112 shown in FIG. 2B is similar to the torque converter assembly 12 shown in FIG. 2A, with the only difference being the connection of the spring(s) 152. For example, an engine output member 116 (which is an input to the torque converter assembly 112), is coupled to a pump 120 of a torque converter 114 and to a driving member 132 of a lockup clutch 130. The driving member 132 of the lockup clutch 130 is selectively connectable to a driven member 136 of the lockup clutch 130. The driven member 136 of the lockup clutch 130 is coupled to a ring gear 146 of the torsional vibration damper 115. A turbine 122 of the torque converter 114 is coupled to a carrier 148 of the torsional vibration damper 115. A sun gear 142 of the torsional vibration damper 115 is coupled to the output of the torque converter assembly 112, which is connected to or formed with a transmission input member 118.

A first spring engagement element 140 is connected to the carrier 148, and a second spring engagement element 150 is connected to the sun gear 142. One or more springs 152 contacts both the first spring engagement element 140 and the second spring engagement element 150.

Figure 2C:
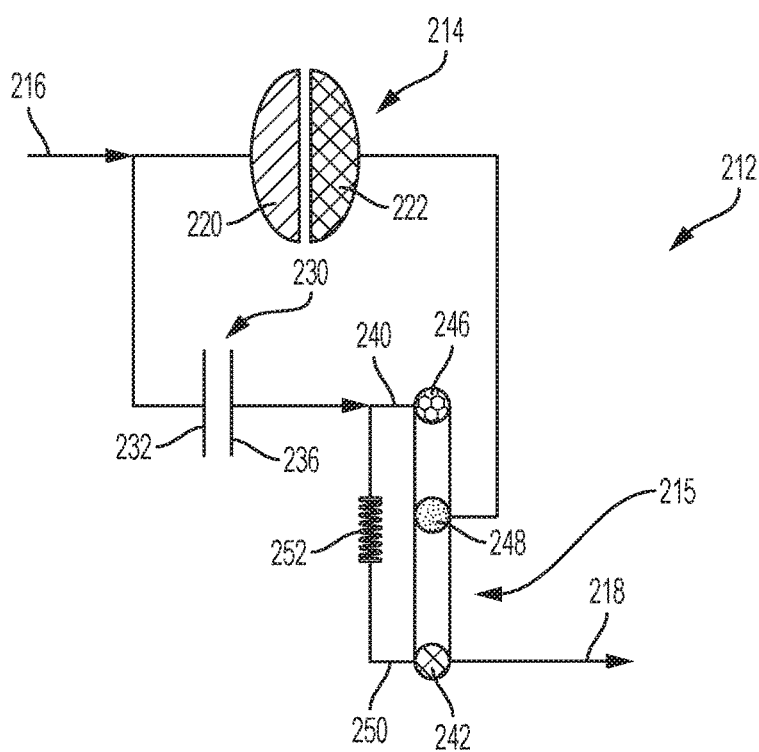
FIG. 2C is a schematic diagrammatic view of yet another variation of a torque converter assembly, in accordance with the principles of the present disclosure.

Referring now to FIG. 2C, yet another variation of a torque converter assembly is schematically illustrated and generally designated at 212. It should be understood that the cross-sectional view of the torque converter assembly 212 may be substantially similar to the cross-sectional view of the torque converter assembly 12 shown above in FIG. 1A, and the details of the torsional vibration damper 15 described in FIGS. 1B-1E may be applied to the torsional vibration damper 215 shown in FIG. 2C, except where any specific differences are described. To this end, similar elements are labeled with a similar number incremented by 200.

The torque converter assembly 212 shown in FIG. 2C is similar to the torque converter assemblies 12, 112 shown in FIGS. 2A-2B, with the only difference being the connection of the spring(s) 252. For example, an engine output member 216 (which is an input to the torque converter assembly 212), is coupled to a pump 220 of a torque converter 214 and to a driving member 232 of a lockup clutch 230. The driving member 232 of the lockup clutch 230 is selectively connectable to a driven member 236 of the lockup clutch 230. The driven member 236 of the lockup clutch 230 is coupled to a ring gear 246 of the torsional vibration damper 215. A turbine 222 of the torque converter 214 is coupled to a carrier 248 of the torsional vibration damper 215. A sun gear 242 of the torsional vibration damper 215 is coupled to the output of the torque converter assembly 212, which is connected to or formed with a transmission input member 218.

A first spring engagement element 240 is connected to the ring gear 246, and a second spring engagement element 250 is connected to the sun gear 242. One or more springs 252 contacts both the first spring engagement element 240 and the second spring engagement element 250.

Figure 4A:
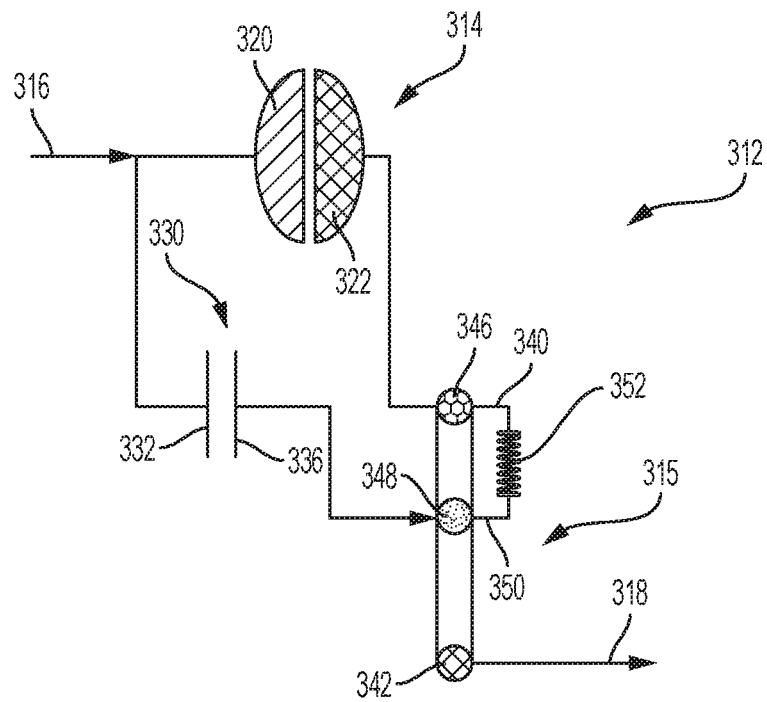
FIG. 4A is a schematic diagrammatic view of still another variation of a torque converter assembly, in accordance with the principles of the present disclosure.

Referring now to FIG. 4A, still another variation of a torque converter assembly is schematically illustrated and generally designated at 312. It should be understood that a cross-sectional view of the torque converter assembly 312 may be substantially similar to the cross-sectional view of the torque converter assembly 12 shown above in FIG. 1A, and the details of the torsional vibration damper 15 described in FIGS. 1B-1E may be applied to the torsional vibration damper 315 shown in FIG. 4A, except where any specific differences are described. To this end, similar elements are labeled with a similar number incremented by 300.

The torque converter assembly 312 shown in FIG. 4A is similar to the torque converter assemblies 12, 112, 212 shown in FIGS. 2A-2C, except that some of the connections are different. For example, an engine output member 316 (which is an input to the torque converter assembly 312), is coupled to a pump 320 of a torque converter 314 and to a driving member 332 of a lockup clutch 330. The driving member 332 of the lockup clutch 330 is selectively connectable to a driven member 336 of the lockup clutch 330.

The driven member 336 of the lockup clutch 330 is coupled to a carrier 348 of the torsional vibration damper 315. A turbine 322 of the torque converter 314 is coupled to a ring gear 346 of the torsional vibration damper 315. A sun gear 342 of the torsional vibration damper 315 is coupled to the output of the torque converter assembly 312, which is connected to or formed with a transmission input member 318.

A first spring engagement element 340 is connected to the ring gear 346, and a second spring engagement element 350 is connected to the carrier 348. One or more springs 352 contacts both the first spring engagement element 340 and the second spring engagement element 350.

Figure 4B:
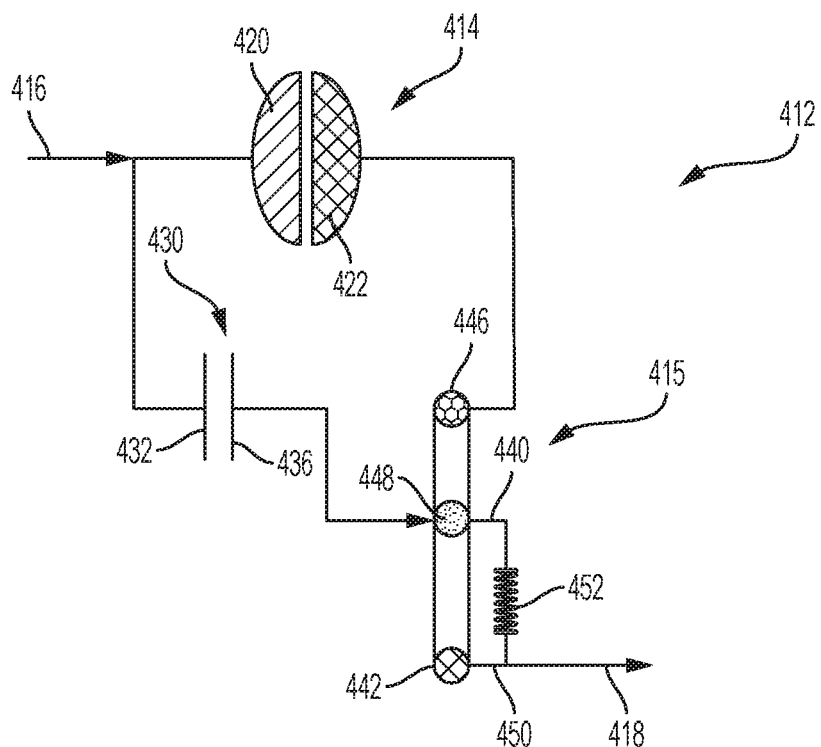
FIG. 4B is a schematic diagrammatic view of still another variation of a torque converter assembly, according to the principles of the present disclosure.

Referring now to FIG. 4B, still another variation of a torque converter assembly is schematically illustrated and generally designated at 412. It should be understood that a cross-sectional view of the torque converter assembly 412 may be substantially similar to the cross-sectional view of the torque converter assembly 12 shown above in FIG. 1A, and the details of the torsional vibration damper 15 described in FIGS. 1B-1E may be applied to the torsional vibration damper 415 shown in FIG. 4B, except where any specific differences are described. To this end, similar elements are labeled with a similar number incremented by 400.

The torque converter assembly 412 shown in FIG. 4B is similar to the torque converter assembly 312 shown in FIG. 4A, with the only difference being the connection of the spring(s) 452. For example, an engine output member 416 (which is an input to the torque converter assembly 412), is coupled to a pump 420 of a torque converter 414 and to a driving member 432 of a lockup clutch 430. The driving member 432 of the lockup clutch 430 is selectively connectable to a driven member 436 of the lockup clutch 430. The driven member 436 of the lockup clutch 430 is coupled to a carrier 448 of the torsional vibration damper 415. A turbine 422 of the torque converter 414 is coupled to a ring gear 446 of the torsional vibration damper 415. A sun gear 442 of the torsional vibration damper 415 is coupled to the output of the torque converter assembly 412, which is connected or formed with a transmission input member 418.

A first spring engagement element 440 is connected to the carrier 448, and a second spring engagement element 450 is connected to the sun gear 442. One or more springs 452 contacts both the first spring engagement element 440 and the second spring engagement element 450.

Referring now to FIG. 4C, still another variation of a torque converter assembly is schematically illustrated and generally designated at 512. It should be understood that a cross-sectional view of the torque converter assembly 512 may be substantially similar to the cross-sectional view of the torque converter assembly 12 shown above in FIG. 1A, and the details of the torsional vibration damper 15 described in FIGS. 1B-1E may be applied to the torsional vibration damper 515 shown in FIG. 4C, except where any specific differences are described. To this end, similar elements are labeled with a similar number incremented by 500.

The torque converter assembly 512 shown in FIG. 4C is similar to the torque converter assemblies 312, 412 shown in FIGS. 4A-4B, with the only difference being the connection of the spring(s) 552. For example, an engine output member 516 (which is an input to the torque converter assembly 512), is coupled to a pump 520 of a torque converter 514 and to a driving member 532 of a lockup clutch 530. The driving member 532 of the lockup clutch 530 is selectively connectable to a driven member 536 of the lockup clutch 530. The driven member 536 of the lockup clutch 530 is coupled to a carrier 548 of the torsional vibration damper 515. A turbine 522 of the torque converter 514 is coupled to a ring gear 546 of the torsional vibration damper 515. A sun gear 542 of the torsional vibration damper 515 is coupled to the output of the torque converter assembly 512, which is connected to or formed with a transmission input member 518.

A first spring engagement element 540 is connected to the ring gear 546, and a second spring engagement element 550 is connected to the sun gear 542. One or more springs 552 contacts both the first spring engagement element 540 and the second spring engagement element 550.

Referring now to FIG. 5A, still another variation of a torque converter assembly is schematically illustrated and generally designated at 612. It should be understood that a cross-sectional view of the torque converter assembly 612 may be substantially similar to the cross-sectional view of the torque converter assembly 12 shown above in FIG. 1A, and the details of the torsional vibration damper 15 described in FIGS. 1B-1E may be applied to the torsional vibration damper 615 shown in FIG. 5A, except where any specific differences are described. To this end, similar elements are labeled with a similar number incremented by 600.

The torque converter assembly 612 shown in FIG. 5A is similar to the torque converter assemblies 12, 112, 212, 312, 412, 512 shown in FIGS. 2A-2C and 4A-4C, except that some of the connections are different. For example, an engine output member 616 (which is an input to the torque converter assembly 612), is coupled to a pump 620 of a torque converter 614 and to a driving member 632 of a lockup clutch 630. The driving member 632 of the lockup clutch 630 is selectively connectable to a driven member 636 of the lockup clutch 630.

The driven member 636 of the lockup clutch 630 is coupled to a carrier 648 of the torsional vibration damper 615. A turbine 622 of the torque converter 614 is coupled to a sun gear 642 of the torsional vibration damper 615. A ring gear 646 of the torsional vibration damper 615 is coupled to the output of the torque converter assembly 612, which is connected to or formed with a transmission input member 618.

A first spring engagement element 640 is connected to the ring gear 646, and a second spring engagement element 650 is connected to the carrier 648. One or more springs 652 contacts both the first spring engagement element 640 and the second spring engagement element 650.

Referring now to FIG. 5B, still another variation of a torque converter assembly is schematically illustrated and generally designated at 712. It should be understood that a cross-sectional view of the torque converter assembly 712 may be substantially similar to the cross-sectional view of the torque converter assembly 12 shown above in FIG. 1A, and the details of the torsional vibration damper 15 described in FIGS. 1B-1E may be applied to the torsional vibration damper 715 shown in FIG. 5B, except where any specific differences are described. To this end, similar elements are labeled with a similar number incremented by 700.

The torque converter assembly 712 shown in FIG. 5B is similar to the torque converter assembly 612 shown in FIG. 5A, with the only difference being the connection of the spring(s) 752. For example, an engine output member 716 (which is an input to the torque converter assembly 712), is coupled to a pump 720 of a torque converter 714 and to a driving member 732 of a lockup clutch 730. The driving member 732 of the lockup clutch 730 is selectively connectable to a driven member 736 of the lockup clutch 730. The driven member 736 of the lockup clutch 730 is coupled to a carrier 748 of the torsional vibration damper 715. A turbine 722 of the torque converter 714 is coupled to a sun gear 742 of the torsional vibration damper 715. A ring gear 746 of the torsional vibration damper 715 is coupled to the output of the torque converter assembly 712, which is connected to or formed with a transmission input member 718.

A first spring engagement element 740 is connected to the carrier 748, and a second spring engagement element 750 is connected to the sun gear 742. One or more springs 752 contacts both the first spring engagement element 740 and the second spring engagement element 750.

Referring now to FIG. 5C, still another variation of a torque converter assembly is schematically illustrated and generally designated at 812. It should be understood that a cross-sectional view of the torque converter assembly 812 may be substantially similar to the cross-sectional view of the torque converter assembly 12 shown above in FIG. 1A, and the details of the torsional vibration damper 15 described in FIGS. 1B-1E may be applied to the torsional vibration damper 815 shown in FIG. 5C, except where any specific differences are described. To this end, similar elements are labeled with a similar number incremented by 800.

The torque converter assembly 812 shown in FIG. 5C is similar to the torque converter assemblies 612, 712 shown in FIGS. 5A-5B, with the only difference being the connection of the spring(s) 852. For example, an engine output member 816 (which is an input to the torque converter assembly 812), is coupled to a pump 820 of a torque converter 814 and to a driving member 832 of a lockup clutch 830. The driving member 832 of the lockup clutch 830 is selectively connectable to a driven member 836 of the lockup clutch 830. The driven member 836 of the lockup clutch 830 is coupled to a carrier 848 of the torsional vibration damper 815. A turbine 822 of the torque converter 814 is coupled to a sun gear 842 of the torsional vibration damper 815. A ring gear 846 of the torsional vibration damper 815 is coupled to the output of the torque converter assembly 812, which is connected to or formed with a transmission input member 818.

A first spring engagement element 840 is connected to the ring gear 846, and a second spring engagement element 850 is connected to the sun gear 842. One or more springs 852 contacts both the first spring engagement element 840 and the second spring engagement element 850.

Figure 6A:
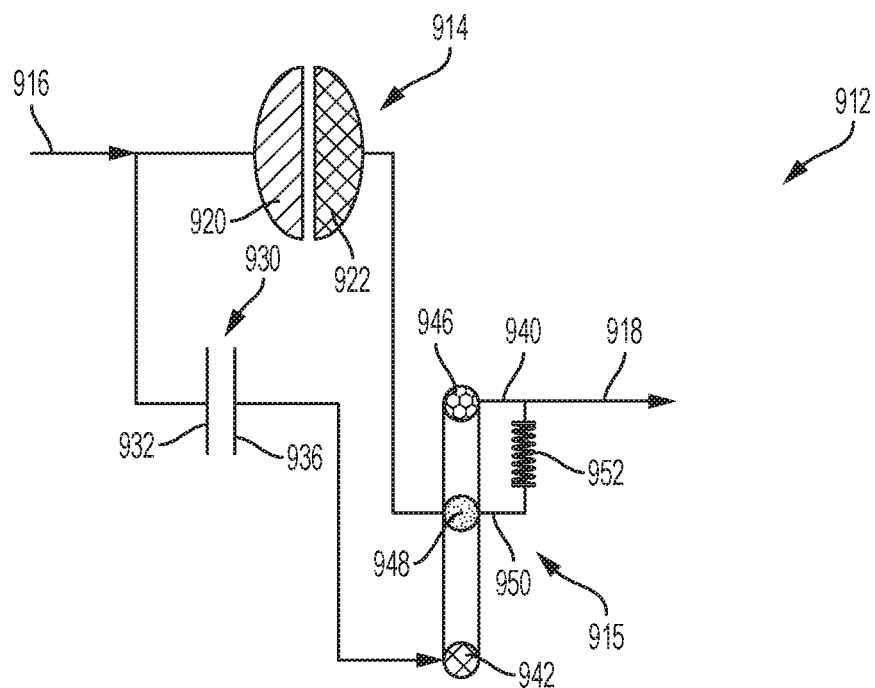
FIG. 6A is a schematic diagrammatic view of still another variation of a torque converter assembly, in accordance with the principles of the present disclosure.

Referring now to FIG. 6A, still another variation of a torque converter assembly is schematically illustrated and generally designated at 912. It should be understood that a cross-sectional view of the torque converter assembly 912 may be substantially similar to the cross-sectional view of the torque converter assembly 12 shown above in FIG. 1A, and the details of the torsional vibration damper 15 described in FIGS. 1B-1E may be applied to the torsional vibration damper 915 shown in FIG. 6A, except where any specific differences are described. To this end, similar elements are labeled with a similar number incremented by 900.

The torque converter assembly 912 shown in FIG. 6A is similar to the torque converter assemblies 12, 112, 212, 312, 412, 512, 612, 712, 812 shown in FIGS. 2A-2C and 4A-5C, except that some of the connections are different. For example, an engine output member 916 (which is an input to the torque converter assembly 912), is coupled to a pump 920 of a torque converter 914 and to a driving member 932 of a lockup clutch 930. The driving member 932 of the lockup clutch 930 is selectively connectable to a driven member 936 of the lockup clutch 930.

The driven member 936 of the lockup clutch 930 is coupled to a sun gear 942 of the torsional vibration damper 915. A turbine 922 of the torque converter 914 is coupled to a carrier 948 of the torsional vibration damper 915. A ring gear 946 of the torsional vibration damper 915 is coupled to the output of the torque converter assembly 912, which is connected to or formed with a transmission input member 918.

A first spring engagement element 940 is connected to the ring gear 946, and a second spring engagement element 950 is connected to the carrier 948. One or more springs 952 contacts both the first spring engagement element 940 and the second spring engagement element 950.

Figure 6B:
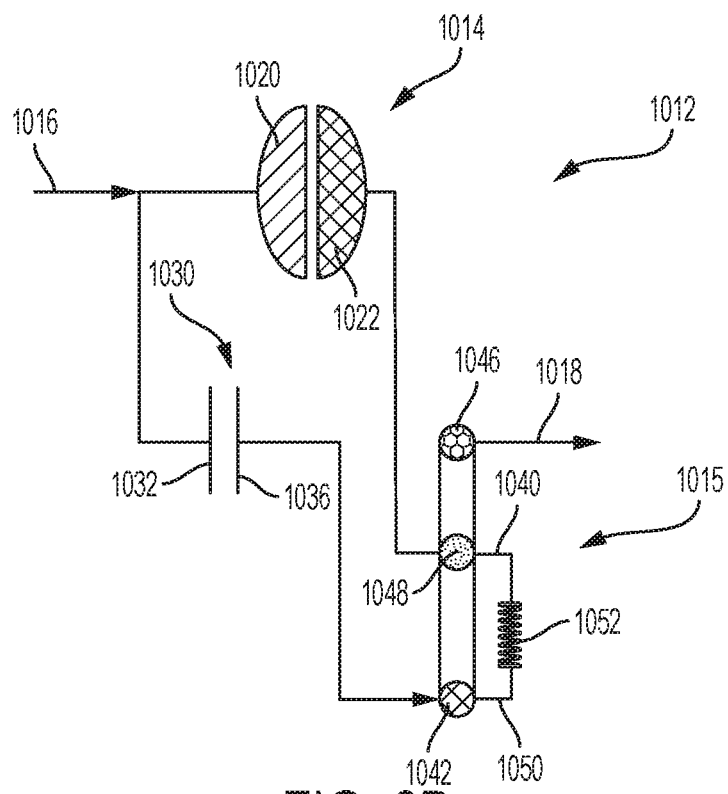
FIG. 6B is a schematic diagrammatic view of still another variation of a torque converter assembly, according to the principles of the present disclosure.

Referring now to FIG. 6B, still another variation of a torque converter assembly is schematically illustrated and generally designated at 1012. It should be understood that a cross-sectional view of the torque converter assembly 1012 may be substantially similar to the cross-sectional view of the torque converter assembly 12 shown above in FIG. 1A, and the details of the torsional vibration damper 15 described in FIGS. 1B-1E may be applied to the torsional vibration damper 1015 shown in FIG. 6B, except where any specific differences are described. To this end, similar elements are labeled with a similar number incremented by 1000.

The torque converter assembly 1012 shown in FIG. 6B is similar to the torque converter assembly 912 shown in FIG. 6A, with the only difference being the connection of the spring(s) 1052. For example, an engine output member 1016 (which is an input to the torque converter assembly 1012), is coupled to a pump 1020 of a torque converter 1014 and to a driving member 1032 of a lockup clutch 1030. The driving member 1032 of the lockup clutch 1030 is selectively connectable to a driven member 1036 of the lockup clutch 1030. The driven member 1036 of the lockup clutch 1030 is coupled to a sun gear 1042 of the torsional vibration damper 1015. A turbine 1022 of the torque converter 1014 is coupled to a carrier 1048 of the torsional vibration damper 1015. A ring gear 1046 of the torsional vibration damper 1015 is coupled to the output of the torque converter assembly 1012, which is connected to or formed with a transmission input member 1018.

A first spring engagement element 1040 is connected to the carrier 1048, and a second spring engagement element 1050 is connected to the sun gear 1042. One or more springs 1052 contacts both the first spring engagement element 1040 and the second spring engagement element 1050.

Figure 6C:
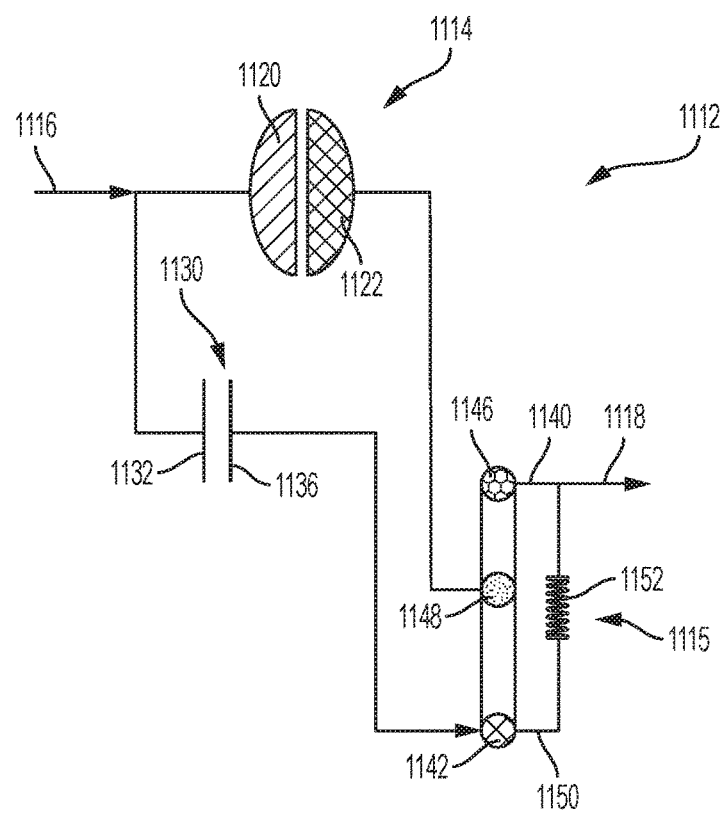
FIG. 6C is a schematic diagrammatic view of still another variation of a torque converter assembly, in accordance with the principles of the present disclosure.

Referring now to FIG. 6C, still another variation of a torque converter assembly is schematically illustrated and generally designated at 1112. It should be understood that a cross-sectional view of the torque converter assembly 1112 may be substantially similar to the cross-sectional view of the torque converter assembly 12 shown above in FIG. 1A, and the details of the torsional vibration damper 15 described in FIGS. 1B-1E may be applied to the torsional vibration damper 1115 shown in FIG. 6C, except where any specific differences are described. To this end, similar elements are labeled with a similar number incremented by 1100.

The torque converter assembly 1112 shown in FIG. 6C is similar to the torque converter assemblies 912, 1012 shown in FIGS. 6A-6B, with the only difference being the connection of the spring(s) 1152. For example, an engine output member 1116 (which is an input to the torque converter assembly 1112), is coupled to a pump 1120 of a torque converter 1114 and to a driving member 1132 of a lockup clutch 1130. The driving member 1132 of the lockup clutch 1130 is selectively connectable to a driven member 1136 of the lockup clutch 1130. The driven member 1136 of the lockup clutch 1130 is coupled to a sun gear 1142 of the torsional vibration damper 1115. A turbine 1122 of the torque converter 1114 is coupled to a carrier 1148 of the torsional vibration damper 1115. A ring gear 1146 of the torsional vibration damper 1115 is coupled to the output of the torque converter assembly 1112, which is connected to or formed with a transmission input member 1118.

A first spring engagement element 1140 is connected to the ring gear 1146, and a second spring engagement element 1150 is connected to the sun gear 1142. One or more springs 1152 contacts both the first spring engagement element 1140 and the second spring engagement element 1150.

Figure 7A:
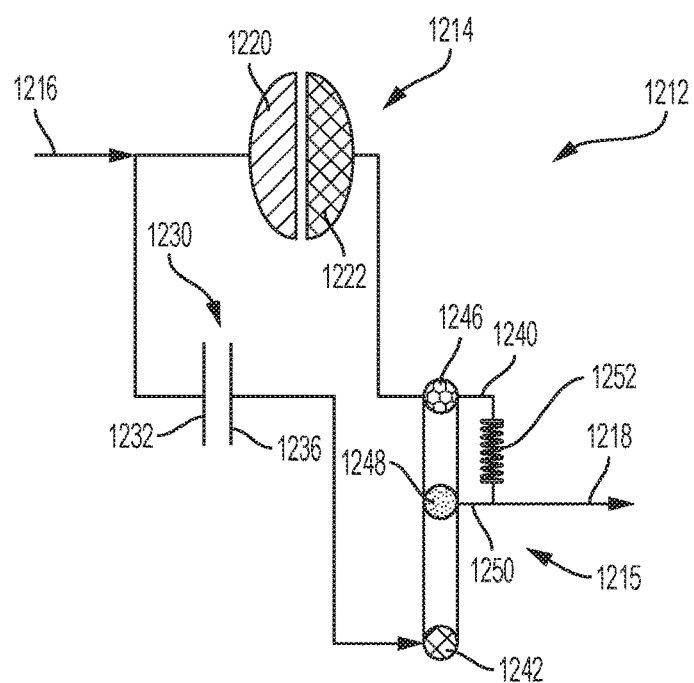
FIG. 7A is a schematic diagrammatic view of still another variation of a torque converter assembly, in accordance with the principles of the present disclosure.

Referring now to FIG. 7A, still another variation of a torque converter assembly is schematically illustrated and generally designated at 1212. It should be understood that a cross-sectional view of the torque converter assembly 1212 may be substantially similar to the cross-sectional view of the torque converter assembly 12 shown above in FIG. 1A, and the details of the torsional vibration damper 15 described in FIGS. 1B-1E may be applied to the torsional vibration damper 1215 shown in FIG. 7A, except where any specific differences are described. To this end, similar elements are labeled with a similar number incremented by 1200.

The torque converter assembly 1212 shown in FIG. 7A is similar to the torque converter assemblies 12, 112, 212, 312, 412, 512, 612, 712, 812, 912, 1012, 1112 shown in FIGS. 2A-2C and 4A-6C, except that some of the connections are different. For example, an engine output member 1216 (which is an input to the torque converter assembly 1212), is coupled to a pump 1220 of a torque converter 1214 and to a driving member 1232 of a lockup clutch 1230. The driving member 1232 of the lockup clutch 1230 is selectively connectable to a driven member 1236 of the lockup clutch 1230.

The driven member 1236 of the lockup clutch 1230 is coupled to a sun gear 1242 of the torsional vibration damper 1215. A turbine 1222 of the torque converter 1214 is coupled to a ring gear 1246 of the torsional vibration damper 1215. A carrier 1248 of the torsional vibration damper 1215 is coupled to the output of the torque converter assembly 1212, which is connected to or formed with a transmission input member 1218.

A first spring engagement element 1240 is connected to the ring gear 1246, and a second spring engagement element 1250 is connected to the carrier 1248. One or more springs 1252 contacts both the first spring engagement element 1240 and the second spring engagement element 1250.

Figure 7B:
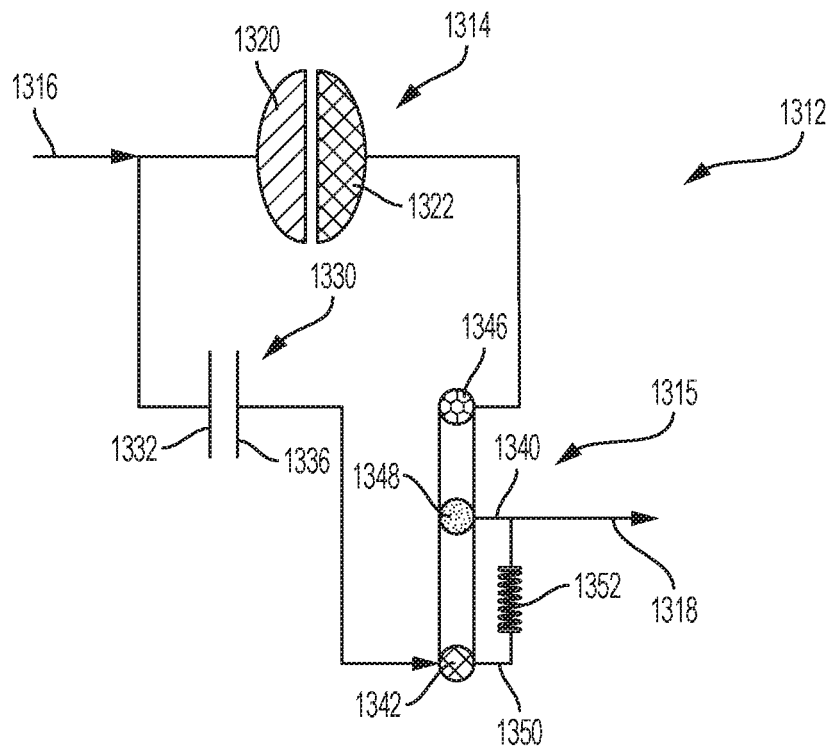
FIG. 7B is a schematic diagrammatic view of still another variation of a torque converter assembly, according to the principles of the present disclosure.

Referring now to FIG. 7B, still another variation of a torque converter assembly is schematically illustrated and generally designated at 1312. It should be understood that a cross-sectional view of the torque converter assembly 1312 may be substantially similar to the cross-sectional view of the torque converter assembly 12 shown above in FIG. 1A, and the details of the torsional vibration damper 15 described in FIGS. 1B-1E may be applied to the torsional vibration damper 1315 shown in FIG. 7B, except where any specific differences are described. To this end, similar elements are labeled with a similar number incremented by 1300.

The torque converter assembly 1312 shown in FIG. 7B is similar to the torque converter assembly 1212 shown in FIG. 7A, with the only difference being the connection of the spring(s) 1352. For example, an engine output member 1316 (which is an input to the torque converter assembly 1312), is coupled to a pump 1320 of a torque converter 1314 and to a driving member 1332 of a lockup clutch 1330. The driving member 1332 of the lockup clutch 1330 is selectively connectable to a driven member 1336 of the lockup clutch 1330. The driven member 1336 of the lockup clutch 1330 is coupled to a sun gear 1342 of the torsional vibration damper 1315. A turbine 1322 of the torque converter 1314 is coupled to a ring gear 1346 of the torsional vibration damper 1315. A carrier 1348 of the torsional vibration damper 1315 is coupled to the output of the torque converter assembly 1312, which is connected to or formed with a transmission input member 1318.

A first spring engagement element 1340 is connected to the carrier 1348, and a second spring engagement element 1350 is connected to the sun gear 1342. One or more springs 1352 contacts both the first spring engagement element 1340 and the second spring engagement element 1350.

Figure 7C:
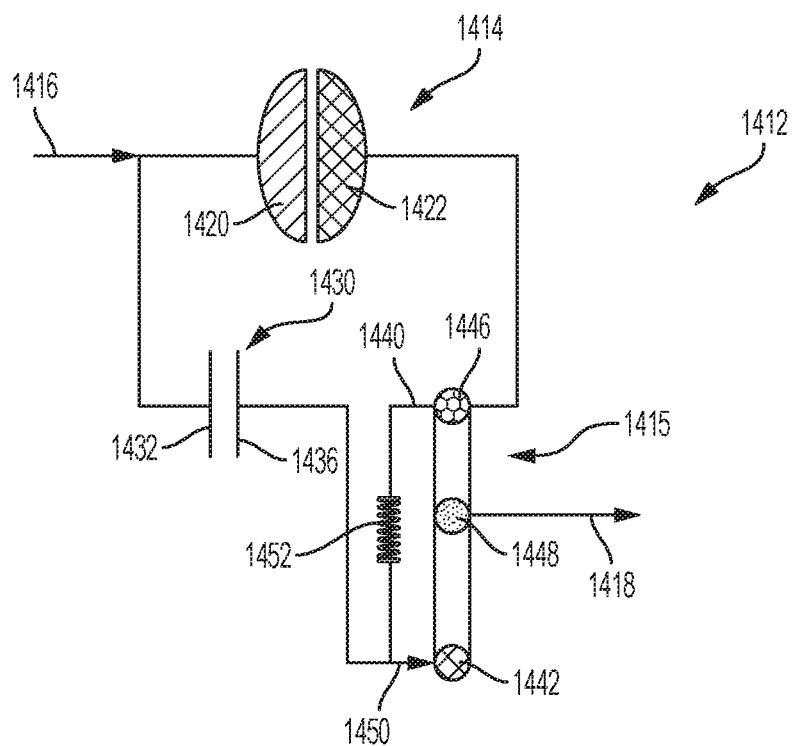
FIG. 7C is a schematic diagrammatic view of still another variation of a torque converter assembly, in accordance with the principles of the present disclosure.

Referring now to FIG. 7C, still another variation of a torque converter assembly is schematically illustrated and generally designated at 1412. It should be understood that a cross-sectional view of the torque converter assembly 1412 may be substantially similar to the cross-sectional view of the torque converter assembly 12 shown above in FIG. 1A, and the details of the torsional vibration damper 15 described in FIGS. 1B-1E may be applied to the torsional vibration damper 1415 shown in FIG. 7C, except where any specific differences are described. To this end, similar elements are labeled with a similar number incremented by 1400.

The torque converter assembly 1412 shown in FIG. 7C is similar to the torque converter assemblies 1212, 1312 shown in FIGS. 7A-7B, with the only difference being the connection of the spring(s) 1452. For example, an engine output member 1416 (which is an input to the torque converter assembly 1412), is coupled to a pump 1420 of a torque converter 1414 and to a driving member 1432 of a lockup clutch 1430. The driving member 1432 of the lockup clutch 1430 is selectively connectable to a driven member 1436 of the lockup clutch 1430. The driven member 1436 of the lockup clutch 1430 is coupled to a sun gear 1442 of the torsional vibration damper 1415. A turbine 1422 of the torque converter 1414 is coupled to a ring gear 1446 of the torsional vibration damper 1415. A carrier 1448 of the torsional vibration damper 1415 is coupled to the output of the torque converter assembly 1412, which is connected to or formed with a transmission input member 1418.

A first spring engagement element 1440 is connected to the ring gear 1446, and a second spring engagement element 1450 is connected to the sun gear 1442. One or more springs 1452 contacts both the first spring engagement element 1440 and the second spring engagement element 1450.

Figure 8A:
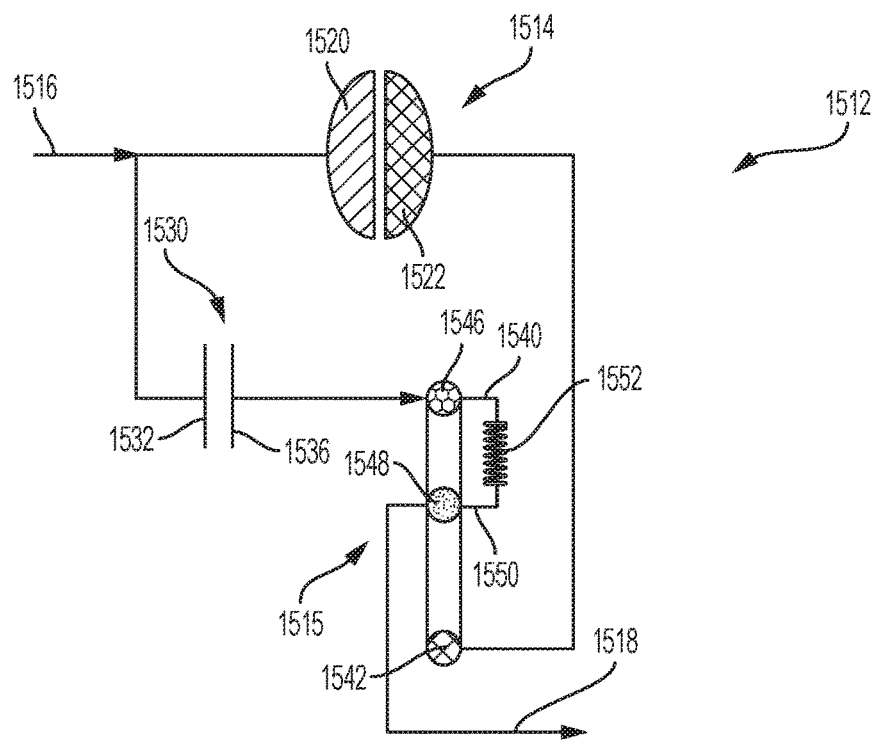
FIG. 8A is a schematic diagrammatic view of still another variation of a torque converter assembly, in accordance with the principles of the present disclosure.

Referring now to FIG. 8A, still another variation of a torque converter assembly is schematically illustrated and generally designated at 1512. It should be understood that a cross-sectional view of the torque converter assembly 1512 may be substantially similar to the cross-sectional view of the torque converter assembly 12 shown above in FIG. 1A, and the details of the torsional vibration damper 15 described in FIGS. 1B-1E may be applied to the torsional vibration damper 1515 shown in FIG. 8A, except where any specific differences are described. To this end, similar elements are labeled with a similar number incremented by 1500.

The torque converter assembly 1512 shown in FIG. 8A is similar to the torque converter assemblies 12, 112, 212, 312, 412, 512, 612, 712, 812, 912, 1012, 1112, 1212, 1312, 1412 shown in FIGS. 2A-2C and 4A-7C, except that some of the connections are different. For example, an engine output member 1516 (which is an input to the torque converter assembly 1512), is coupled to a pump 1520 of a torque converter 1514 and to a driving member 1532 of a lockup clutch 1530. The driving member 1532 of the lockup clutch 1530 is selectively connectable to a driven member 1536 of the lockup clutch 1530.

The driven member 1536 of the lockup clutch 1530 is coupled to a ring gear 1546 of the torsional vibration damper 1515. A turbine 1522 of the torque converter 1514 is coupled to a sun gear 1542 of the torsional vibration damper 1515. A carrier 1548 of the torsional vibration damper 1515 is coupled to the output of the torque converter assembly 1512, which is connected to or formed with a transmission input member 1518.

A first spring engagement element 1540 is connected to the ring gear 1546, and a second spring engagement element 1550 is connected to the carrier 1548. One or more springs 1552 contacts both the first spring engagement element 1540 and the second spring engagement element 1550.

Figure 8B:
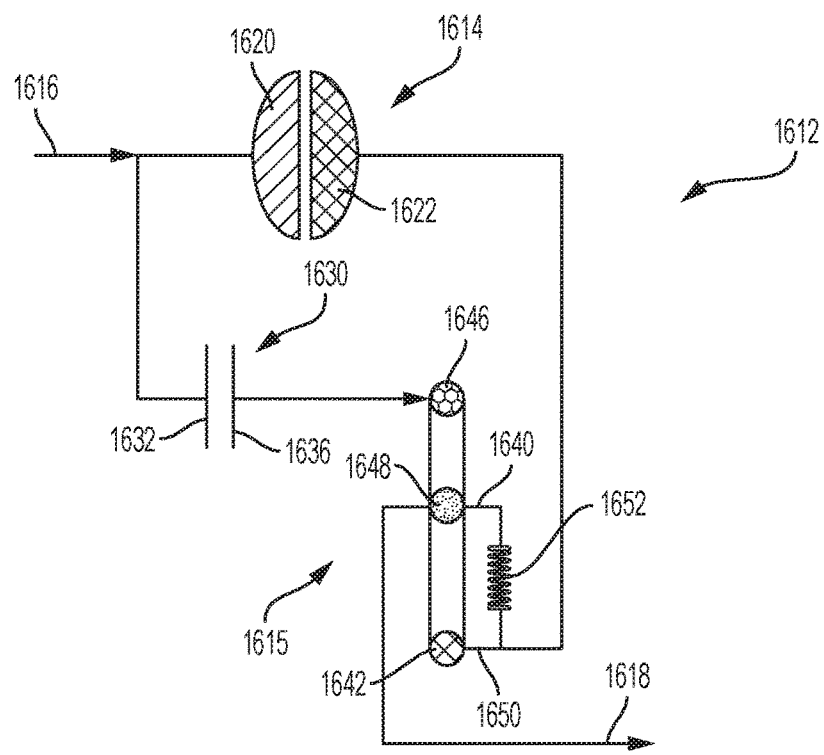
FIG. 8B is a schematic diagrammatic view of still another variation of a torque converter assembly, according to the principles of the present disclosure.

Referring now to FIG. 8B, still another variation of a torque converter assembly is schematically illustrated and generally designated at 1612. It should be understood that a cross-sectional view of the torque converter assembly 1612 may be substantially similar to the cross-sectional view of the torque converter assembly 12 shown above in FIG. 1A, and the details of the torsional vibration damper 15 described in FIGS. 1B-1E may be applied to the torsional vibration damper 1615 shown in FIG. 8B, except where any specific differences are described. To this end, similar elements are labeled with a similar number incremented by 1600.

The torque converter assembly 1612 shown in FIG. 7B is similar to the torque converter assembly 1512 shown in FIG. 7A, with the only difference being the connection of the spring(s) 1652. For example, an engine output member 1616 (which is an input to the torque converter assembly 1612), is coupled to a pump 1620 of a torque converter 1614 and to a driving member 1632 of a lockup clutch 1630. The driving member 1632 of the lockup clutch 1630 is selectively connectable to a driven member 1636 of the lockup clutch 1630. The driven member 1636 of the lockup clutch 1630 is coupled to a ring gear 1646 of the torsional vibration damper 1615. A turbine 1622 of the torque converter 1614 is coupled to a sun gear 1642 of the torsional vibration damper 1615. A carrier 1648 of the torsional vibration damper 1615 is coupled to the output of the torque converter assembly 1612, which is connected to or formed with a transmission input member 1618.

A first spring engagement element 1640 is connected to the carrier 1648, and a second spring engagement element 1650 is connected to the sun gear 1642. One or more springs 1652 contacts both the first spring engagement element 1640 and the second spring engagement element 1650.

Figure 8C:
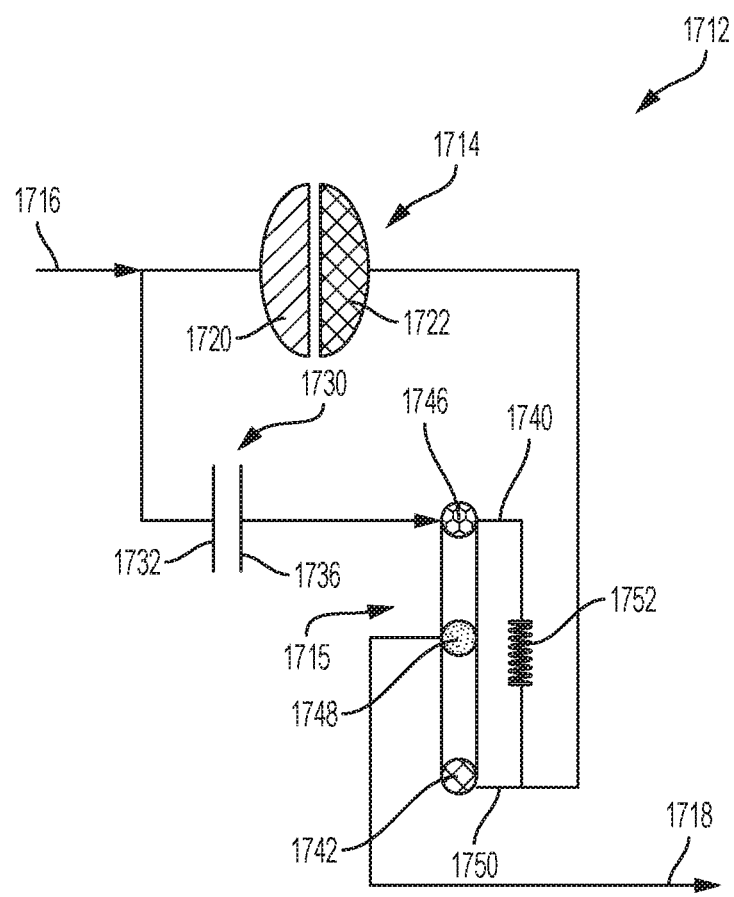
FIG. 8C is a schematic diagrammatic view of still another variation of a torque converter assembly, in accordance with the principles of the present disclosure.

Referring now to FIG. 8C, still another variation of a torque converter assembly is schematically illustrated and generally designated at 1712. It should be understood that a cross-sectional view of the torque converter assembly 1712 may be substantially similar to the cross-sectional view of the torque converter assembly 12 shown above in FIG. 1A, and the details of the torsional vibration damper 15 described in FIGS. 1B-1E may be applied to the torsional vibration damper 1715 shown in FIG. 8C, except where any specific differences are described. To this end, similar elements are labeled with a similar number incremented by 1700.

The torque converter assembly 1712 shown in FIG. 8C is similar to the torque converter assemblies 1512, 1612 shown in FIGS. 8A-8B, with the only difference being the connection of the spring(s) 1752. For example, an engine output member 1716 (which is an input to the torque converter assembly 1712), is coupled to a pump 1720 of a torque converter 1714 and to a driving member 1732 of a lockup clutch 1730. The driving member 1732 of the lockup clutch 1730 is selectively connectable to a driven member 1736 of the lockup clutch 1730. The driven member 1736 of the lockup clutch 1730 is coupled to a ring gear 1746 of the torsional vibration damper 1715. A turbine 1722 of the torque converter 1714 is coupled to a sun gear 1742 of the torsional vibration damper 1715. A carrier 1748 of the torsional vibration damper 1715 is coupled to the output of the torque converter assembly 1712, which is connected to or formed with a transmission input member 1718.

A first spring engagement element 1740 is connected to the ring gear 1746, and a second spring engagement element 1750 is connected to the sun gear 1742. One or more springs 1752 contacts both the first spring engagement element 1740 and the second spring engagement element 1750.

Referring now to FIGS. 9A-9D, another configuration of the torsional vibration damper 15 of FIG. 1A is illustrated and designated at 15". It should be understood that the torsional vibration damper 15" shown in FIGS. 9A-9D could be used for any of the torsional vibration dampers 15, 115, 215, 315, 415, 515, 615, 715, 815, 915, 1015, 1115, 1215, 1315, 1415, 1515, 1615, 1715 described above. Similar components are denoted using double prime symbols.

In this example, as in FIGS. 1A-1E, the input to the torsional vibration damper 15" is provided through a connection plate 34" fixed to the lock-up clutch plate 36". The connection plate 34" may be fixed to a first spring support member 40", for example by multiple fasteners 41 (only one of which is shown in this view) such as rivets. However, in the various examples explained in FIGS. 2A-2C and 4A-8C, the first spring support member 40" may be connected instead to other components. The torsional vibrational damper 15" includes a planetary gear set 38". Components of the planetary gear set 38" include a sun gear 42", a carrier member 48" bearing multiple pinion gears 44a", 44b", 44c", and a ring gear 46".

The multiple pinion gears 44a", 44b", 44c" individually rotating about the sun gear 42" each have external gear teeth meshing with external gear teeth of the sun gear 42". The external gear teeth of each of the pinion gears 44a", 44b", 44c" are also meshed to internal gear teeth of the ring gear 46", which is positioned having the pinion gears 44a", 44b", 44c" internal to the ring gear 46". The pinion gears 44a", 44b", 44c" are individually rotatably mounted to separate pinion shafts that are connected to a carrier 48".

The torsional vibration damper 15" also includes a second spring support member 50", which may be connected to the carrier 48" as shown, for example, by multiple fasteners 59 such as rivets, or alternatively to the sun gear 42" as explained above. The second spring support member 50" has an arc or semicircular shape that receives multiple springs 52". The first spring support member 40" and the second spring support member 50" together support and contact each of the springs 52". The first spring support member 40" includes multiple first spring contact members 63 integrally connected to and extending from the first spring support member 40" that are oriented at a first angle with respect to the transmission input shaft 18. In some examples, the first angle is substantially parallel to a longitudinal axis 54 of the transmission input shaft 18 (shown in FIGS. 1A and 9D). The second spring support member 50" includes multiple second spring contact members 65 integrally connected to and extending from the second spring support member 50" that are oriented at a second angle different from the first angle of the first spring contact members 63. In some examples, the second angle is oriented perpendicular to the first angle and therefore perpendicular to the longitudinal axis 54 of the transmission input shaft 18.

The first and second spring contact members 63, 65 each directly contact ends of the springs 52" to compress the springs 52". The multiple springs 52", which may be compression springs, are positioned between and are compressed by relative angular rotation between the first spring support member 40" and the second spring support member 50", as the first spring support member 40" angularly rotates with respect to the second spring support member 50". The angular orientation, and in particular the perpendicular orientation of the second angle of the second spring contact members 65 with respect to the first angle of the first spring contact members 63 ensures that an even compression of each of the springs 52" occurs over an entire range of spring compression, preventing offset loads from being applied to the springs 52", and therefore mitigating against lateral or spring radial deflection that could result in frictional contact between a body or coil of the springs 52" and either of the first spring support member 40" or the second spring support member 50".

In this example, the first spring support member or engagement element 40" is fixed to the ring gear 46", and the second spring support member or engagement element 50" is connected to the carrier 48"; however it should be understood that the first spring support member 40" and the second spring support member 50" could be connected to any of the sun gear 42", the carrier 48", or the ring gear 46" as explained above with respect to FIGS. 2A-2C and 4A-8C. In the configuration of the present example, the carrier 48" is restrained in its arc of rotation with respect to the first spring support member 40" by compression and expansion of the springs 52".

Each of the multiple first spring contact members 63 may be arranged and function similarly. The first spring contact members 63 are oriented co-axial to a longitudinal axis 54 (shown in FIGS. 1A and 9D). The longitudinal axis 54 intersects a central axis 79 of one of the springs 60. Each of the first spring contact members 63 can be formed for example by bending material of the first spring support member 40".

Each second contact member 65 may be divided into a first contact member portion 65a and a second contact member portion 65b extending from directly opposed sides of a spring receiving portion 81 of the second spring support member 50". Each of the first contact member portion 65a and the second contact member portion 65b are coaxially aligned on a second member longitudinal axis 82. The second member longitudinal axis 82 also intersects the central axis 79 and is oriented substantially perpendicular to the longitudinal axis 54 of the powertrain 10. Each of the first contact member portion 65a and the second contact member portion 65b may be bent into position using a metal forming operation such that the first contact member portion 65a and the second contact member portion 65b are created as a single part with the spring receiving portion 81 of the second spring support member 50".

A central spacing "A" between the first contact member portion 65a and the second contact member portion 65b provides clearance to freely receive one of the first spring contact members 63. One of the first spring contact members 63 and one of the second spring contact members 65 together contact each end of both opposite ends of each of the springs 52" in a non-deflected condition of the springs 52". During angular rotation between the first spring support member 40" and the second spring support member 50", the perpendicular orientation of the first spring contact members 63 and the second spring contact members 65 provides for even axial compression of the springs 52", thereby mitigating against the springs 52" frictionally contacting the first spring support member 40" or the second spring support member 50" during spring compression. Lateral movement of the springs 52" is therefore constrained by the second spring contact members 65. The perpendicular orientation of the first spring contact members 63 with respect to the second spring contact members 65 mitigates against or precludes a side-force acting on or resulting from deflection of the springs 52" that would allow the springs 52" to contact or push against the first spring support member 40".

The spring receiving portion 81 defines a semi-spherical shape having an inner diameter "B" which is larger than a diameter of the spring 52" to allow free axial expansion and compression of the spring 52". In this example, the spring receiving portion 81 semi-spherical shape defines an arc length greater than 90 degrees about a radius of curvature "C" defined with respect to the central axis 79 of the springs 52". The semi-spherical shape of the spring receiving portion 81 also assists in retaining the springs 52". The spring receiving portion 81 semi-spherical shape may be created using a metal forming operation to avoid secondary welding. One or both of the first and second spring contact members 63, 65 can include one of multiple spring support tubes 84 fixed to one of the first spring contact member 63 or the second spring contact member 65 and received within a central bore "D" defined by the spring body coils of each of the springs 52". Each spring support tube 84 supports its associated spring 52" and centrally positions the spring 52" away from contact with the semispherical wall of the spring receiving portion 81 of the second spring support member 50".

Figure 9A:
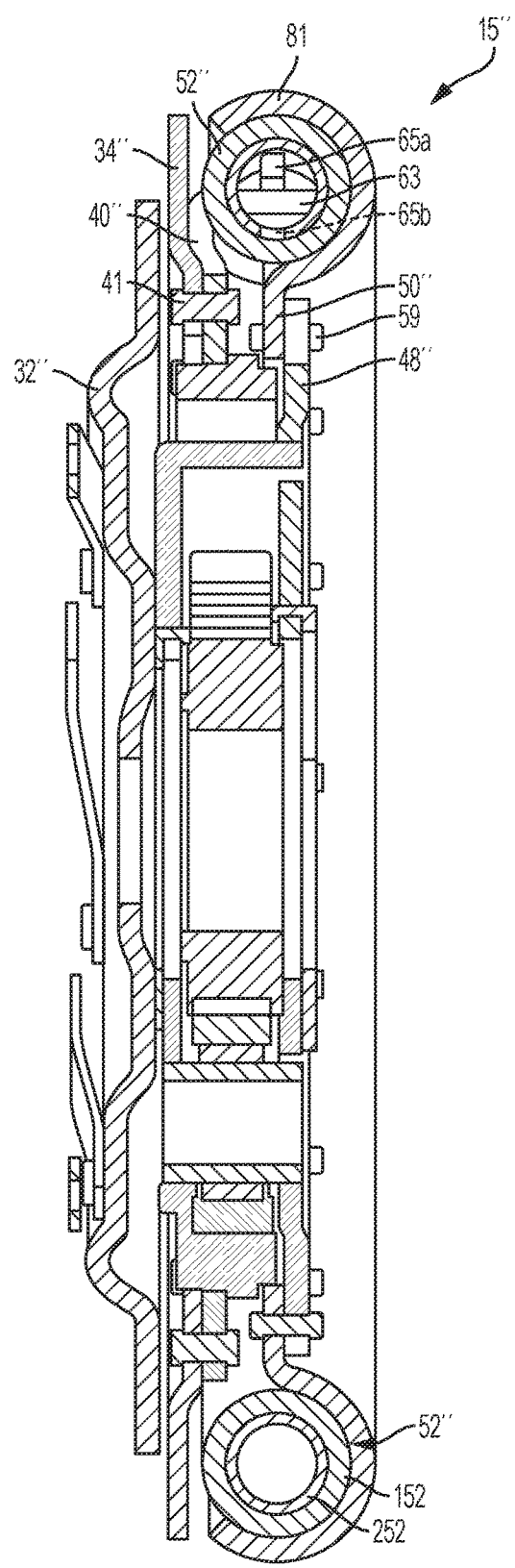
FIG. 9A is a front cross-sectional view of yet another example of a torsional vibration damper, according to the principles of the present disclosure.
Figure 9B:
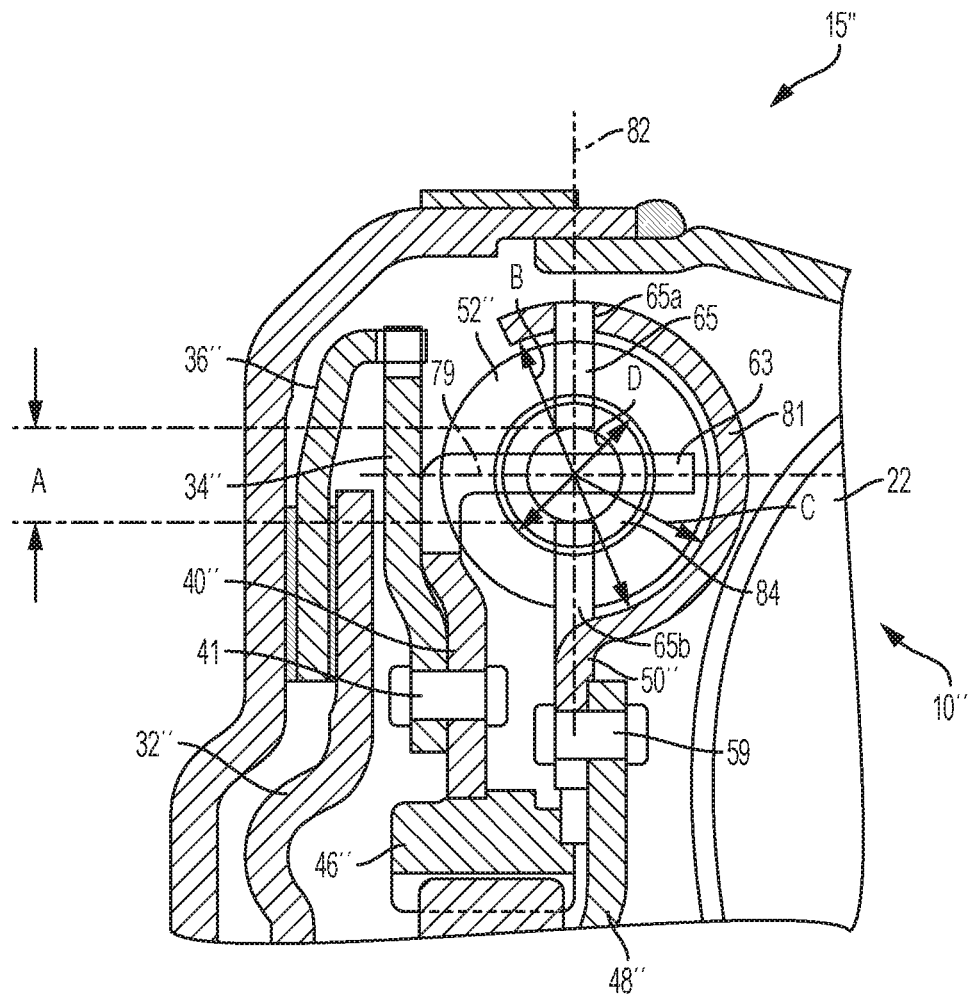
FIG. 9B is a close-up front cross-sectional of a portion of a torque converter assembly incorporating the torsional vibration damper illustrated in FIG. 9A, in accordance with the principles of the present disclosure.
Figure 9C:
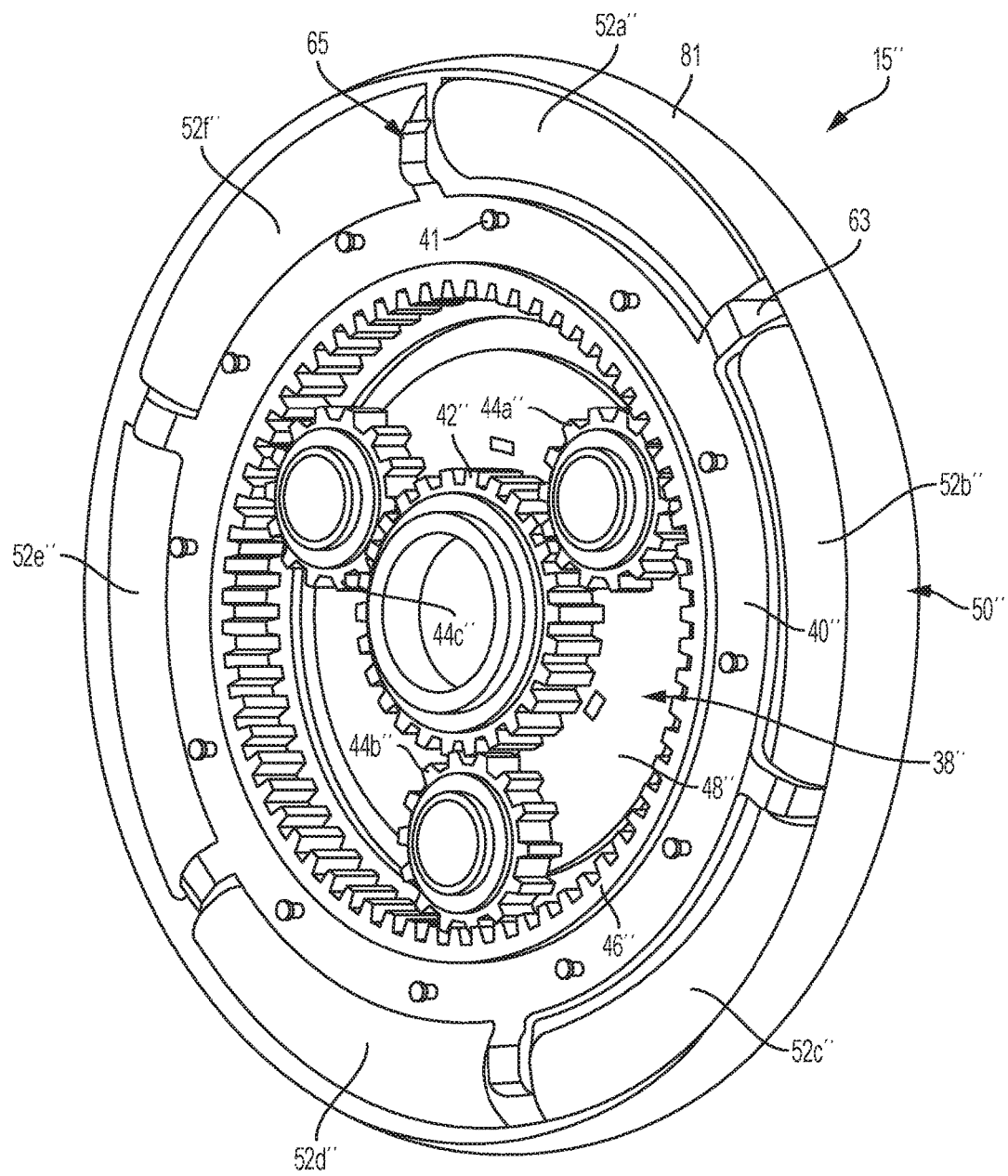
FIG. 9C is a front left perspective view of the torsional vibration damper of FIGS. 9A-9B, according to the principles of the present disclosure.
Figure 9D:
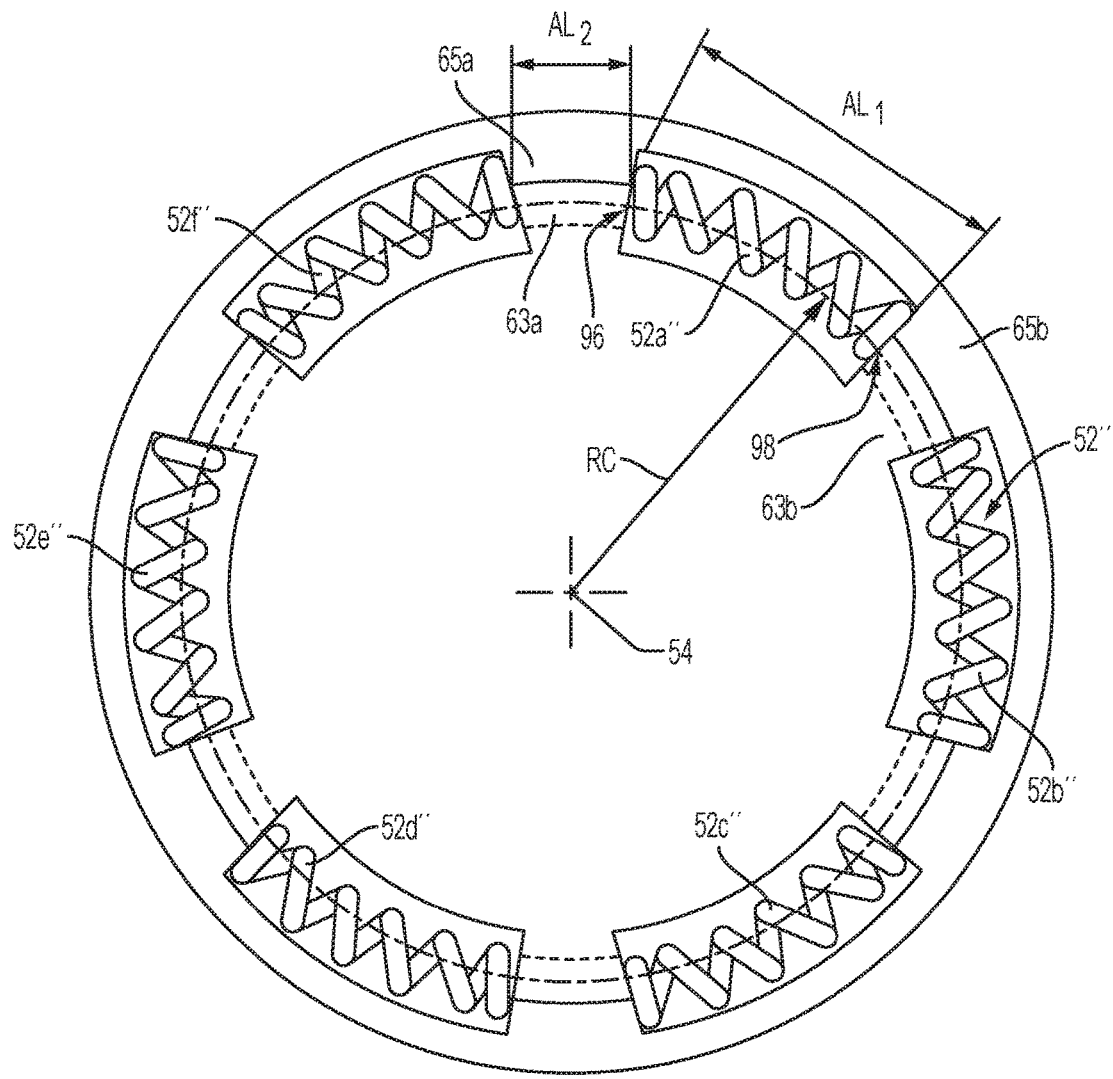
FIG. 9D is a partial cross-sectional view of the torsional vibration damper of FIGS. 9A-9C, in accordance with the principles of the present disclosure.

Referring to FIG. 9D, in some examples, the set of springs 52" includes six compression spring sets identified as spring sets 52a", 52b", 52c", 52d", 52e", 52f". The spring sets 52a", 52b", 52c", 52d", 52e", 52f" each have opposed ends 96, 98. Each of the opposed ends 96, 98 has one of the first spring contact members 63 and one of the multiple second spring contact members 65 positioned proximate and adjacent thereto. The spring sets 52a", 52b", 52c", 52d", 52e", 52f" are compressed during axial rotation of one or both of the first spring support member 40" or the second spring support member 50" with respect to the longitudinal axis 54.

Each of the springs 52" in a non-deflected state occupies an arc length "AL1". Each of the first spring contact members 63 and the second spring contact members 65 occupies an arc length "AL2". Each of the springs 52" has a spring outside diameter (OD), the springs 52" are positioned within the spring receiving portion 84 of the second spring support member 50", and a central axis of each of the springs 52" is positioned on a spring radius of curvature RC. For example, spring 52a" is retained between and contacts a first spring contact member 63a and a second spring contact member 65a at a first end 96 of the spring 52a", and spring 52a" also contacts a first spring contact member 63b and a second spring contact member 65b at an opposite second end 98 of the spring 52a". An exemplary torsional rotation of the first spring support member 40" causes the first spring contact members 63 to compress each of the springs 52a", 52b", 52c", 52d", 52e", 52f" against a next successive one of the second spring contact members 65 of the second spring support member 50".

Referring to FIG. 9C, the spring sets 52a", 52b", 52c", 52d", 52e", 52f" are shown in their spaced apart alignment and positioned in the spring receiving portion 81 of the second spring support member 50". Portions of each of the first spring contact members 63 are visible in this view which are integrally connected to and extend substantially perpendicular to the first spring support member 40", which space successive ones of the springs 52a", 52b", 52c", 52d", 52e", 52f" apart from each other.

Referring to FIG. 9A, in this example, the carrier 48" supports the second spring support member 50" and the spring receiving portion 81, which partially encloses the springs 52". The first contact member portions 65a, the second contact member portions 65b, and the first spring contact members 63 contact and compress the springs 52" when the carrier 48" coupled to the second spring support member 50" axially rotate with respect to the first spring support member 40".

With reference again to FIGS. 9A and 9D, the spring sets 52a", 52b", 52c", 52d", 52e", 52f" can each include an individual coiled spring, or, as most clearly shown in FIG. 9A, can each include a nested pair of springs including an outer spring 152 and a smaller diameter inner spring 252 nested within the outer spring 152. Clearance can be provided between the outer spring 152 and the inner spring 252 to minimize frictional contact between the spring set pairs. The first spring contact members 63 and both the first contact member portions 65a and the second contact member portions 65b of the second contact member 65 contact both the outer spring 152 and the inner spring 252 in a deflected or compressed condition of the springs, but contact only the outer spring 152 in a non-deflected condition of the spring sets.

It should also be appreciated that the torsional vibrational damper 15" may have other configurations, such as having fewer or greater than six springs, springs in parallel, and modifications with respect to the quantity of planet gears of the planetary gear set 38" without departing from the scope of the present disclosure.

In examples where a dual-mass fly wheel is used instead of a torque converter, the secondary mass of the dual-mass fly wheel could be coupled to one of the planetary nodes instead of the turbine of the torque converter being connected to a planetary node.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. Further, although each of the examples is described above as having certain features, any one or more of those features described with respect to any example of the disclosure can be implemented in and/or combined with features of any of the other examples, even if that combination is not explicitly described. In other words, the described examples are not mutually exclusive, and permutations of one or more examples with one another remain within the scope of this disclosure.

What is claimed is:

1. A torque transfer assembly configured to transfer torque between a prime mover and an automotive transmission, the torque transfer assembly comprising:
    an input member configured to transfer torque from the prime mover;
    an output member configured to transfer torque to the automotive transmission;
    a torque transfer component having an incoming side and an outgoing side, the incoming side being coupled to the input member;
    a clutch having a driving element and a driven element, the driving element being coupled to the input member; and
    a torsional vibration damper comprising:
        a planetary gear set having a first node, a second node, and a third node;
        a first spring engagement element connected to one of the first, second, and third nodes, and a second spring engagement element connected to another of the first, second, and third nodes;
        at least one spring contacting both the second spring engagement element and the first spring engagement element and configured to permit the second spring engagement element to angularly deflect with respect to the first spring engagement element,
    wherein the outgoing side of the torque transfer component is coupled to the first node of the planetary gear set, the driven element of the clutch is connected to the second node of the planetary gear set, and the output member is coupled to the third node of the planetary gear set.

2. The torque transfer assembly of claim 1, wherein the torque transfer component is one of a torque converter and a dual-mass flywheel.

3. The torque transfer assembly of claim 2, wherein each of the first, second, and third nodes comprises one of the following: a ring gear, a carrier member bearing a plurality of pinion gears, and a sun gear.

4. A torque converter assembly configured to transfer torque between a prime mover and an automotive transmission, the torque converter assembly comprising:
    an input member configured to transfer torque from the prime mover;
    an output member configured to transfer torque to the automotive transmission;
    a torque converter having a pump and a turbine, the pump being coupled to the input member;
    a lockup clutch having a driving element and a driven element, the driving element being coupled to the input member; and
    a torsional vibration damper comprising:
        a planetary gear set having a first node, a second node, and a third node;
        a first spring engagement element connected to one of the first, second, and third nodes, and a second spring engagement element connected to another of the first, second, and third nodes;
        at least one spring contacting both the second spring engagement element and the first spring engagement element and configured to permit the second spring engagement element to angularly deflect with respect to the first spring engagement element,
    wherein the turbine is coupled to the first node of the planetary gear set, the driven element of the lockup clutch is connected to the second node of the planetary gear set, and the output member is coupled to the third node of the planetary gear set.

5. The torque converter assembly of claim 4, wherein each of the first, second, and third nodes comprises one of the following: a ring gear, a carrier member bearing a plurality of pinion gears, and a sun gear.

6. The torque converter assembly of claim 5, wherein the first spring engagement element is connected to the ring gear, and the second spring engagement element is connected to the carrier member.

7. The torque converter assembly of claim 5, wherein the first spring engagement element is connected to the carrier member, and the second spring engagement element is connected to the sun gear.

8. The torque converter assembly of claim 5, wherein the first spring engagement element is connected to the ring gear, and the second spring engagement element is connected to the sun gear.

9. The torque converter assembly of claim 4, wherein the first node is a carrier member, the second node is a ring gear, and the third node is a sun gear.

10. The torque converter assembly of claim 4, wherein the first node is a carrier member, the second node is a sun gear, and the third node is a ring gear.

11. The torque converter assembly of claim 4, wherein the first node is a ring gear, the second node is a carrier member, and the third node is a sun gear.

12. The torque converter assembly of claim 4, wherein the first node is a ring gear, the second node is a sun gear, and the third node is a carrier member.

13. The torque converter assembly of claim 4, wherein the first node is a sun gear, the second node is a ring gear, and the third node is a carrier member.

14. The torque converter assembly of claim 4, wherein the first node is a sun gear, the second node is a carrier member, and the third node is a ring gear.

15. A powertrain for a motor vehicle comprising:
   an engine configured to be disposed in the motor vehicle and having an engine output member;
   an automatic transmission selectively connected to the engine, the automatic transmission having a transmission input member;
   a torque converter assembly configured to transfer torque between the engine and the automatic transmission, the torque converter assembly comprising:
      a torque converter having a pump and a turbine, the pump being coupled to the engine output member;
      a lockup clutch having a driving element and a driven element, the driving element being coupled to the engine output member; and
      a torsional vibration damper comprising:
         a planetary gear set having a first node, a second node, and a third node;
         a first spring engagement element connected to one of the first, second, and third nodes, and a second spring engagement element connected to another of the first, second, and third nodes; and
         at least one spring contacting both the second spring engagement element and the first spring engagement element and configured to permit the second spring engagement element to angularly deflect with respect to the first spring engagement element,
      wherein the turbine is coupled to the first node of the planetary gear set, the driven element of the lockup clutch is connected to the second node of the planetary gear set, and the transmission input member is coupled to the third node of the planetary gear set.

16. The powertrain of claim 15, wherein each of the first, second, and third nodes comprises one of the following: a ring gear, a carrier member bearing a plurality of pinion gears, and a sun gear.

17. The powertrain of claim 16, wherein the first spring engagement element is connected to the ring gear, and the second spring engagement element is connected to the carrier member.

18. The torque converter assembly of claim 16, wherein the first spring engagement element is connected to the carrier member, and the second spring engagement element is connected to the sun gear.

19. The torque converter assembly of claim 16, wherein the first spring engagement element is connected to the ring gear, and the second spring engagement element is connected to the sun gear.

* * * * *